(12) United States Patent
Kamei et al.

(10) Patent No.: US 10,712,144 B2
(45) Date of Patent: Jul. 14, 2020

(54) TROLLEY-WIRE MEASUREMENT DEVICE AND TROLLEY-WIRE MEASUREMENT METHOD

(71) Applicant: Mitsubishi Electric Corporation, Chiyoda-ku, Tokyo (JP)

(72) Inventors: Katsuyuki Kamei, Tokyo (JP); Megumi Irie, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 22 days.

(21) Appl. No.: 15/775,859

(22) PCT Filed: Dec. 15, 2015

(86) PCT No.: PCT/JP2015/085093
§ 371 (c)(1),
(2) Date: May 14, 2018

(87) PCT Pub. No.: WO2017/103999
PCT Pub. Date: Jun. 22, 2017

(65) Prior Publication Data
US 2018/0328714 A1 Nov. 15, 2018

(51) Int. Cl.
*G06K 9/00* (2006.01)
*G01B 11/00* (2006.01)
(Continued)

(52) U.S. Cl.
CPC ............. *G01B 11/002* (2013.01); *B60M 1/13* (2013.01); *B60M 1/28* (2013.01); *B61L 23/042* (2013.01);
(Continued)

(58) Field of Classification Search
CPC ......... B60M 1/13; G01B 11/00; G01B 11/002
See application file for complete search history.

(56) References Cited

U.S. PATENT DOCUMENTS

2014/0341435 A1  11/2014  Shimada et al.
2017/0144682 A1   5/2017  Kamei et al.
(Continued)

FOREIGN PATENT DOCUMENTS

JP    6-281317 A      10/1994
JP    08029130 A   *  2/1996
(Continued)

OTHER PUBLICATIONS

Kim, H. "Pantograph Detection System using Image Processing Techniques, 1." (2015).*
(Continued)

*Primary Examiner* — Li Liu
(74) *Attorney, Agent, or Firm* — Buchanan Ingersoll & Rooney PC

(57) ABSTRACT

A trolley-wire measurement device includes a rail detection unit to detect rails from point-group data that is an aggregate of points obtained by measuring a target object three-dimensionally, the rails defining a railway on which a train runs, a reference setting unit to set a reference for measuring a height and a displacement of a point on a trolley wire on the basis of the rails detected, a trolley-wire detection unit to detect the point on the trolley wire from the point-group data, and a height and displacement measurement unit to measure a height and a displacement of the point on the trolley wire by using the reference.

21 Claims, 19 Drawing Sheets

(51) Int. Cl.
  *B60M 1/28* (2006.01)
  *B60M 1/13* (2006.01)
  *B61L 23/04* (2006.01)
  *G01B 11/245* (2006.01)
  *G01B 21/16* (2006.01)
  *G01B 21/20* (2006.01)

(52) U.S. Cl.
  CPC ............ *G01B 11/245* (2013.01); *G01B 21/16* (2013.01); *G01B 21/20* (2013.01)

(56) References Cited

U.S. PATENT DOCUMENTS

| | | | |
|---|---|---|---|
| 2017/0219335 A1 | | 8/2017 | Shiraishi et al. |
| 2017/0228885 A1 | * | 8/2017 | Baumgartner ......... G01B 11/04 |

FOREIGN PATENT DOCUMENTS

| | | | |
|---|---|---|---|
| JP | 9-163502 A | | 6/1997 |
| JP | 11108621 A | * | 4/1999 |
| JP | 2000258126 A | * | 9/2000 |
| JP | 2000-289499 A | | 10/2000 |
| JP | 2001021323 | * | 1/2001 |
| JP | 2004-286500 | * | 10/2004 |
| JP | 2005-70840 A | | 3/2005 |
| JP | 2010-202017 A | | 9/2010 |
| JP | 2010-243416 A | | 10/2010 |
| JP | 2010-249709 A | | 11/2010 |
| JP | 2013-136352 A | | 7/2013 |
| JP | 2014-32444 A | | 2/2014 |
| JP | 2014-225956 A | | 12/2014 |
| JP | 2015-158397 A | | 9/2015 |
| WO | WO 2015/198423 A1 | | 12/2015 |
| WO | WO 2016/006283 A1 | | 1/2016 |
| WO | WO 2016/021224 A1 | | 2/2016 |

OTHER PUBLICATIONS

International Search Report (PCT/ISA/210) dated Mar. 22, 2016, by the Japanese Patent Office as the International Searching Authority for International Application No. PCT/JP2015/085093.

Notification of Reasons for Refusal issued in corresponding Japanese Application No. 2016-562617 dated Nov. 18, 2016.

Notification of Reasons for Refusal issued in corresponding Japanese Application No. 2016-562617 dated Mar. 30, 2017.

* cited by examiner

FIG.2

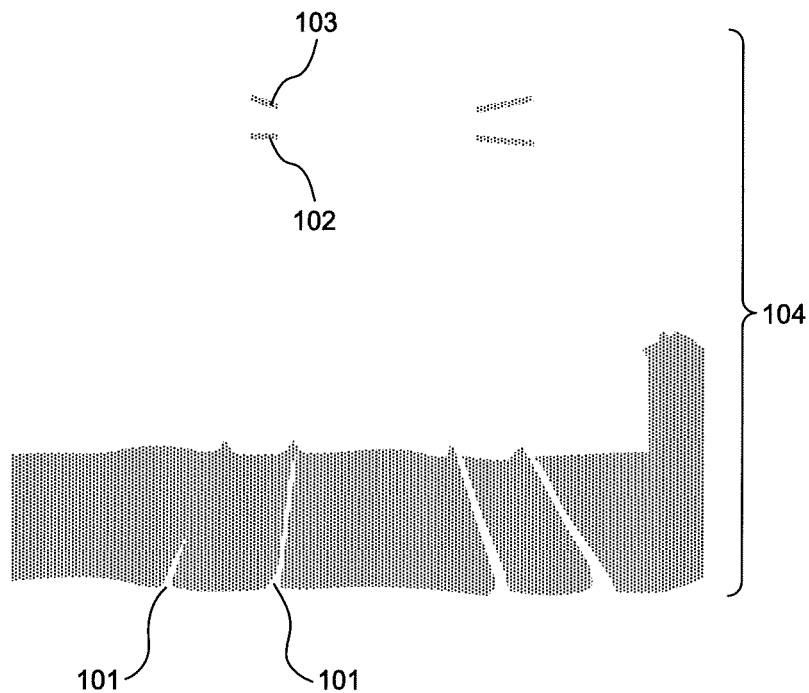

FIG.3

| |
|---|
| COORDINATE VALUE $x_1$ OF $P_1$ IN X DIRECTION |
| COORDINATE VALUE $y_1$ OF $P_1$ IN Y DIRECTION |
| COORDINATE VALUE $z_1$ OF $P_1$ IN Z DIRECTION |
| COORDINATE VALUE $x_2$ OF $P_2$ IN X DIRECTION |
| COORDINATE VALUE $y_2$ OF $P_2$ IN Y DIRECTION |
| COORDINATE VALUE $z_2$ OF $P_2$ IN Z DIRECTION |
| ⋮ |
| COORDINATE VALUE $x_k$ OF $P_k$ IN X DIRECTION |
| COORDINATE VALUE $y_k$ OF $P_k$ IN Y DIRECTION |
| COORDINATE VALUE $z_k$ OF $P_k$ IN Z DIRECTION |

FIG.6

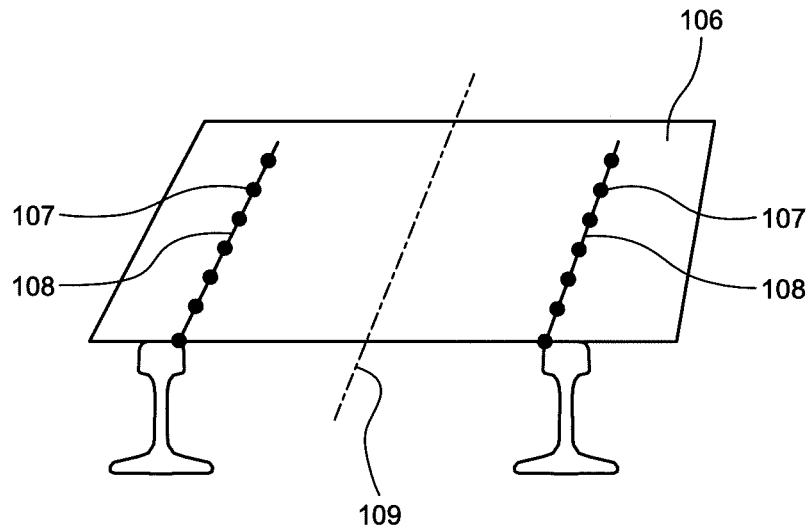

| COORDINATE VALUE $xl_1$ OF $L_1$ IN X DIRECTION |
|---|
| COORDINATE VALUE $yl_1$ OF $L_1$ IN Y DIRECTION |
| COORDINATE VALUE $zl_1$ OF $L_1$ IN Z DIRECTION |
| COORDINATE VALUE $xl_2$ OF $L_2$ IN X DIRECTION |
| COORDINATE VALUE $yl_2$ OF $L_2$ IN Y DIRECTION |
| COORDINATE VALUE $zl_2$ OF $L_2$ IN Z DIRECTION |
| ⋮ |
| COORDINATE VALUE $xl_k$ OF $L_k$ IN X DIRECTION |
| COORDINATE VALUE $yl_k$ OF $L_k$ IN Y DIRECTION |
| COORDINATE VALUE $zl_k$ OF $L_k$ IN Z DIRECTION |

(b) $107R_i$

| COORDINATE VALUE $xr_1$ OF $R_1$ IN X DIRECTION |
|---|
| COORDINATE VALUE $yr_1$ OF $R_1$ IN Y DIRECTION |
| COORDINATE VALUE $zr_1$ OF $R_1$ IN Z DIRECTION |
| COORDINATE VALUE $xr_2$ OF $R_2$ IN X DIRECTION |
| COORDINATE VALUE $yr_2$ OF $R_2$ IN Y DIRECTION |
| COORDINATE VALUE $zr_2$ OF $R_2$ IN Z DIRECTION |
| ⋮ |
| COORDINATE VALUE $xr_k$ OF $R_k$ IN X DIRECTION |
| COORDINATE VALUE $yr_k$ OF $R_k$ IN Y DIRECTION |
| COORDINATE VALUE $zr_k$ OF $R_k$ IN Z DIRECTION |

FIG.12

| |
|---|
| COORDINATE VALUE $X_1$ OF $T_1$ IN X DIRECTION |
| COORDINATE VALUE $Y_1$ OF $T_1$ IN Y DIRECTION |
| COORDINATE VALUE $Z_1$ OF $T_1$ IN Z DIRECTION |
| HEIGHT $h_1$ OF $T_1$ |
| DISPLACEMENT $d_1$ OF $T_1$ |
| COORDINATE VALUE $X_2$ OF $T_2$ IN X DIRECTION |
| COORDINATE VALUE $Y_2$ OF $T_2$ IN Y DIRECTION |
| COORDINATE VALUE $Z_2$ OF $T_2$ IN Z DIRECTION |
| HEIGHT $h_2$ OF $T_2$ |
| DISPLACEMENT $d_2$ OF $T_2$ |
| ⋮ |
| COORDINATE VALUE $X_H$ OF $T_H$ IN X DIRECTION |
| COORDINATE VALUE $Y_H$ OF $T_H$ IN Y DIRECTION |
| COORDINATE VALUE $Z_H$ OF $T_H$ IN Z DIRECTION |
| HEIGHT $h_H$ OF $T_H$ |
| DISPLACEMENT $d_H$ OF $T_H$ |

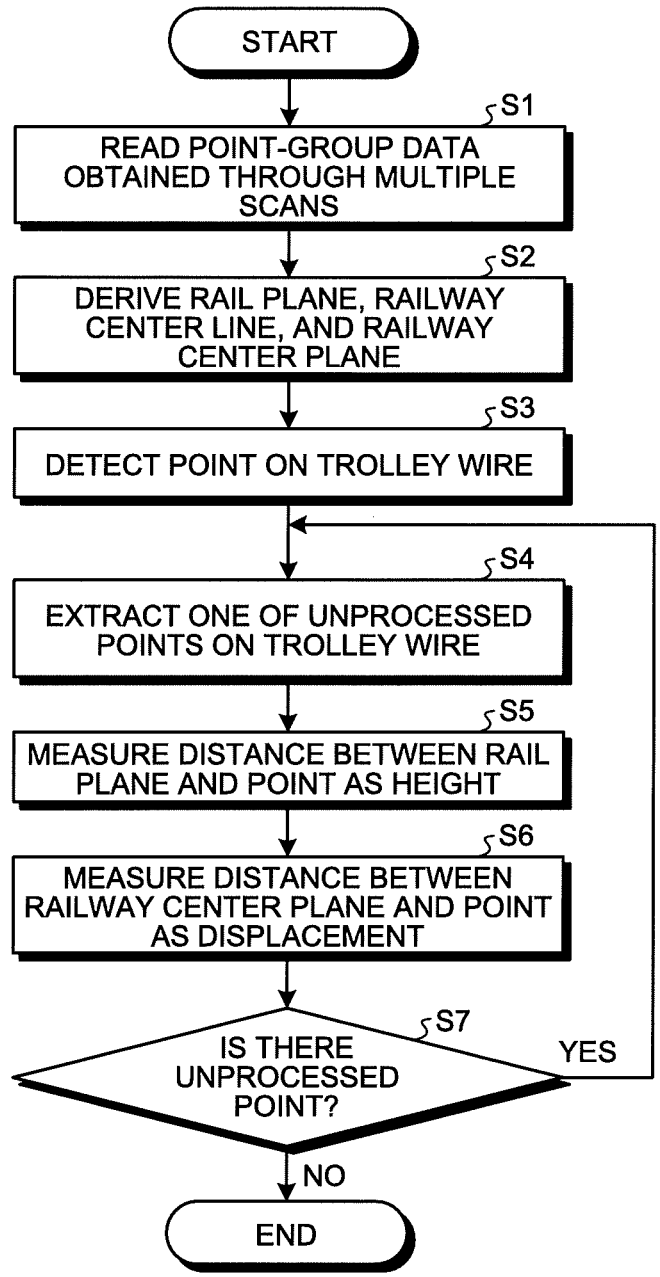

TROLLEY-WIRE MEASUREMENT DEVICE AND TROLLEY-WIRE MEASUREMENT METHOD

FIELD

The present invention relates to a trolley-wire measurement device and a trolley-wire measurement method for measuring the position of a trolley wire.

BACKGROUND

There has conventionally been a device that measures the position of a trolley wire for supplying the power to a train. Patent Literature 1 below discloses a technique for determining that relatively low points of measured points within a set range are a trolley wire candidate to calculate coordinate values of the trolley wire on the basis of the installation conditions of the trolley wire and the speed of a vehicle with a measurement device mounted thereon.

CITATION LIST

Patent Literature

Patent Literature 1: Japanese Patent Application No. 2010-243416

SUMMARY

Technical Problem

For the conventional technique described above, unfortunately, the position of a trolley wire is measured with reference to the measurement device mounted on a vehicle. Such a measurement poses a problem of failure to accurately measure the position of a trolley wire relative to the reference if the vehicle sways.

The present invention has been achieved to solve the above problems, and an object of the present invention is to provide a trolley-wire measurement device that is capable of measuring a height and a displacement of a trolley wire relative to a reference set on a railway.

Solution to Problem

In order to solve the above problems and achieve the object, the present invention provides a trolley-wire measurement device comprising: a rail detection unit to detect rails from point-group data that is an aggregate of points obtained by measuring a target object three-dimensionally, the rails defining a railway on which a train runs; a reference setting unit to set a reference for measuring a height and a displacement of a point on a trolley wire on a basis of the rails detected; a trolley-wire detection unit to detect the point on the trolley wire from the point-group data; and a height and displacement measurement unit to measure the height and the displacement of the point on the trolley wire by using the reference.

Advantageous Effects of Invention

The present invention provides an effect of measuring the height and the displacement of the trolley wire relative to the reference set on the railway.

BRIEF DESCRIPTION OF DRAWINGS

FIG. 2 is a diagram illustrating an example of a three-dimensionally measured target object that is expressed by point-group data stored in a storage unit according to the first embodiment.

FIG. 3 is a diagram illustrating a configuration example of the point-group data stored in the storage unit according to the first embodiment.

FIG. 6 is a conceptual diagram illustrating a process of deriving a railway center line in the reference setting unit according to the first embodiment.

FIG. 7 is a diagram illustrating an example of data on rail points held in the rail detection unit according to the first embodiment.

FIG. 12 is a diagram illustrating data on a height and a displacement of a point on the trolley wire which have been measured by the height and displacement measurement unit according to the first embodiment.

FIG. 13 is a flowchart illustrating a trolley-wire measuring process in the trolley-wire measurement device according to the first embodiment.

DESCRIPTION OF EMBODIMENTS

A trolley-wire measurement device and a trolley-wire measurement method according to embodiments of the present invention will be described in detail below with reference to the accompanying drawings. The present invention is not limited to the embodiments.

First Embodiment

Figure 1:
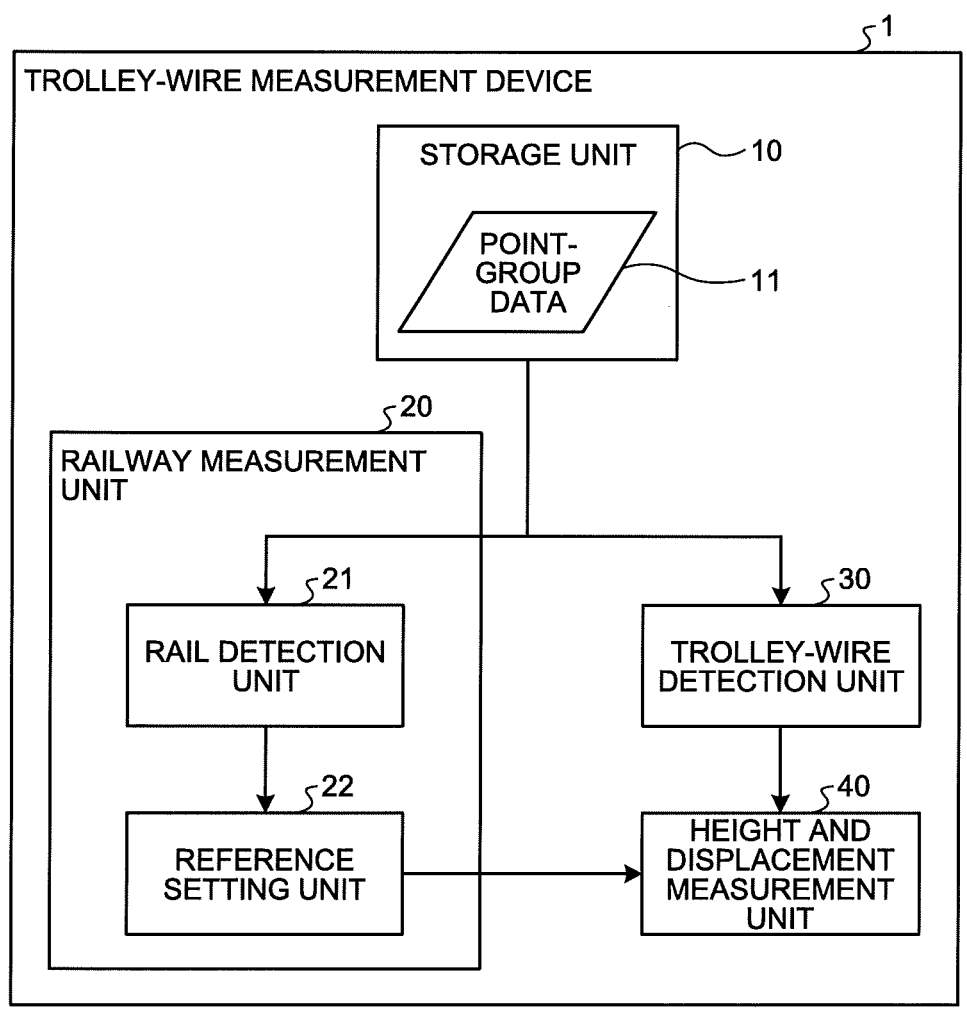
FIG. 1 is a block diagram illustrating a configuration example of a trolley-wire measurement device according to a first embodiment.

FIG. 1 is a block diagram illustrating a configuration example of a trolley-wire measurement device 1 according to a first embodiment of the present invention. The trolley-wire measurement device 1 measures the position of a trolley wire relative to a reference that is set on the basis of the position of rails that define a railway on which a train runs. Specifically, the trolley-wire measurement device 1 measures a height and a displacement of a trolley wire. The trolley-wire measurement device 1 includes a storage unit 10, a railway measurement unit 20, a trolley-wire detection unit 30, and a height and displacement measurement unit 40.

The storage unit 10 stores point-group data 11 therein. The point-group data 11, which is an aggregate of points having three-dimensional coordinate values, is a result of a three-dimensional measurement of a target object such as a trolley wire, a messenger wire, and a rail. The point-group data 11 refers to data expressed in terms of coordinate values of the points measured three-dimensionally by a measuring device using a laser scanner, a camera, a GPS antenna, and the like. The point-group data 11 is data on points measured three-dimensionally by the measuring device such as a Mobile Mapping System (MMS). However, the point-group data 11 is not limited thereto. FIG. 2 is a diagram illustrating an example of a three-dimensionally measured target object that is expressed by the point-group data 11 stored in the storage unit 10 according to the first embodiment. In FIG. 2, the scope of the three-dimensionally measured target object expressed by the point-group data 11 is defined as including rails 101 laid on the ground, a trolley wire 102 hanging in the air, a messenger wire 103 suspending the trolley wire 102, and the like. One point $P_i$ of a point group 104 of the three-dimensionally measured target object can be expressed as $P_i$ ($x_i$, $y_i$, $z_i$) by using three-axis coordinate values in the x-axis direction, the y-axis direction, and the z-axis direction. FIG. 3 is a diagram illustrating a configuration example of the point-group data 11 stored in the storage unit 10 according to the first embodiment. The storage unit 10 stores therein the point-group data 11 that is defined by the data on three-axis coordinate values of points $P_1$ to $P_K$ including the aforementioned point $P_i$ in the x-axis direction, the y-axis direction, and the z-axis direction. The x-axis direction, the y-axis direction, and the z-axis direction can be defined, for example, using a plane rectangular coordinate system such that the xy-axis is in the horizontal plane and the z-axis is oriented in the height direction. Alternatively, a coordinate system may be employed which has an origin at any point and defines, for example, the eastward direction as the x-axis direction, the northward direction as the y-axis direction, and the vertically upward direction as the z-axis direction. The unit indicating the data on the coordinate values of each point can be, but not limited to, meters (m) or the like.

The railway measurement unit 20 includes a rail detection unit 21 and a reference setting unit 22.

Figure 4:
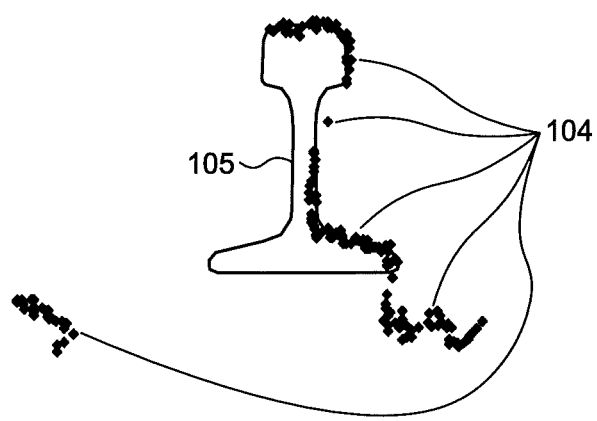
FIG. 4 is a conceptual diagram illustrating a process of detecting a rail in a rail detection unit according to the first embodiment.

The rail detection unit 21 detects the rail 101 from the point-group data 11 stored in the storage unit 10. For example, the rail detection unit 21 extracts from the point-group data 11 the point group 104 defined by a plurality of points, and then detects the rail 101 by performing matching between the shape expressed by the extracted point group 104 and a template 105 that is an aggregate of points taking the shape of the rail 101. FIG. 4 is a conceptual diagram illustrating a process of detecting the rail 101 in the rail detection unit 21 according to the first embodiment. As illustrated in FIG. 4, the rail detection unit 21 detects that there is the rail 101 at the position of the point group 104 that matches the shape of the template 105.

Figure 5:
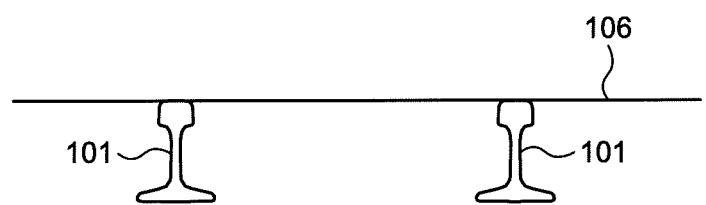
FIG. 5 is a conceptual diagram illustrating a process of deriving a rail plane in a reference setting unit according to the first embodiment.

On the basis of the rails 101 detected by the rail detection unit 21, the reference setting unit 22 sets a reference for measurement of the height and the displacement of the point on the trolley wire 102. Specifically, on the basis of the rails 101 detected by the rail detection unit 21, the reference setting unit 22 derives a rail plane which is a plane connecting respective top surfaces of the detected, two, left and right rails 101, that is, the reference setting unit 22 derives the rail plane that is a plane including the surfaces which a train contacts. FIG. 5 is a conceptual diagram illustrating a process of deriving a rail plane 106 in the reference setting unit 22 according to the first embodiment. As illustrated in FIG. 5, the reference setting unit 22 sets the rail plane 106 that is the plane connecting the respective top surfaces of the two, left and right rails 101. In practice, the reference setting unit 22 may compute to thereby derive the rail surface 106 from the point-group data 11 illustrated in FIG. 3 without drawing the rails 101 as illustrated in FIG. 5.

The reference setting unit 22 derives from the rail plane 106 a railway center line positioned at the center between the two left and right side rails 101. FIG. 6 is a conceptual diagram illustrating a process of deriving a railway center line 109 in the reference setting unit 22 according to the first embodiment. For example, the reference setting unit 22 sets rail points 107 at positions on the inner sides of the top portions of the two, left and right ones of the rails 101 detected by the rail detection unit 21. The reference setting unit 22 derives a rail line 108 connecting the rail points 107 of each of the left and right rails 101 by, for example, least squares approximation of the rail points 107. The reference setting unit 22 then derives the railway center line 109 that is a line positioned at the center between the respective derived rail lines 108 of the left and right rails 101. The railway center line 109 is equally distant from each of the rails 101. The positions of the rail points 107 are not limited to the inner sides of the top portions of the two, left and right rails 101, but may be the outer sides of the top portions of the two, left and right rails 101.

In FIG. 6, the rail points 107 indicate particular positions on the rail 101 detected by the rail detection unit 21. In this example, the rail points 107 indicate the positions on the inner sides of the top portions of the two left and right rails 101. The detection process in the rail detection unit 21 provides the coordinate values of the rail points 107 for the corrected location at which the rail 101 should be disposed relative to the live measured point-group data stored in the point-group data 11. FIG. 7 is a diagram illustrating an example of the data on the rail points 107 held in the rail detection unit 21 according to the first embodiment. The rail detection unit 21 holds therein the data on the rail points 107 illustrated in FIG. 7. The reference setting unit 22 uses the data on the rail points 107 illustrated in FIG. 7. As illustrated in FIGS. 6 and 7, the rail detection unit 21 detects the two rails 101 per railway that are the left and right rails 101 in this example, and holds the data on rail points $107L_i$ of the left-side rail 101 and the data on rail points $107R_i$ of the right-side rail 101.

Figure 8:
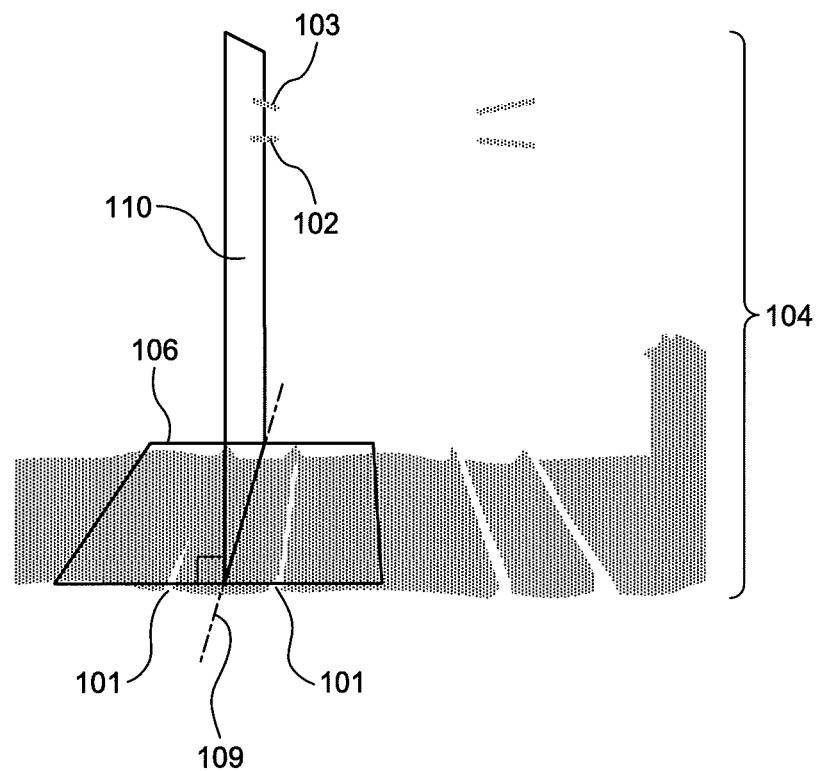
FIG. 8 is a diagram illustrating how a railway center plane derived by the reference setting unit relates to a rail plane and the railway center line according to the first embodiment.

Further, the reference setting unit 22 derives a railway center plane orthogonal to the rail plane 106 on the railway center line 109. FIG. 8 is a diagram illustrating how a railway center plane 110 derived by the reference setting unit 22 relates to the rail plane 106 and the railway center line 109 according to the first embodiment. In FIG. 8, the rail plane 106, the railway center line 109, and the railway center plane 110 are added to the illustrations in FIG. 2. The reference setting unit 22 outputs the derived rail plane 106 and the derived railway center plane 110 as a first reference and a second reference, respectively, to the height and displacement measurement unit 40.

The trolley-wire detection unit 30 detects points on the trolley wire 102 from the point-group data 11 stored in the storage unit 10. The trolley-wire detection unit 30 is capable of performing a process of detecting points on the trolley wire 102 on all of the pieces of point-group data 11 stored in the storage unit 10. Unfortunately, such a detection process for all of the pieces of point-group data increases the processing amount for detecting the points on the trolley wire 102. It is thus desirable for the trolley-wire detection unit 30 to limit the area of the point group 104 that is to be extracted from the point-group data 11. For example, the trolley-wire detection unit 30 defines a specified range at a certain height or greater as an area of the point group 104 that is to be extracted. Alternatively, where the measurement of the trolley wire 102 has been previously performed, the lateral extraction area may be limited using information on the track of a vehicle having the measuring device mounted thereon at the time of the previous measurement, and information on the rail position.

Figure 9:
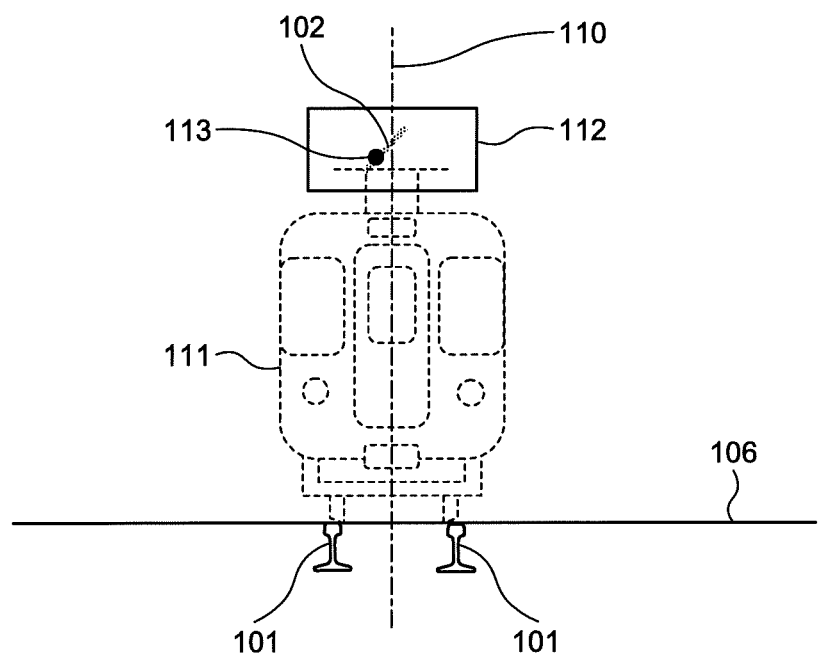
FIG. 9 is a diagram illustrating an example of an extraction area of point-group data to be extracted from the storage unit in a trolley-wire detection unit according to the first embodiment.

In general, the position of the trolley wire 102 is defined such that the height of the trolley wire from the rail plane 106 falls within a specified range, and that the displacement of the trolley wire, which is a distance from the railway center plane 110, falls within a specified range. Although not illustrated in FIG. 1, thus, the trolley-wire detection unit 30 obtains information on the rail plane 106 and the railway center plane 110 from the reference setting unit 22, and then limits the area of the point group 104 that is to be extracted from the point-group data 11, to a range slightly greater than the range of the height and displacement specified as the position of the trolley wire 102. FIG. 9 is a diagram illustrating an example of an extraction area of the point-group data 11 to be extracted from the storage unit 10 in the trolley-wire detection unit 30 according to the first embodiment. FIG. 9 illustrates a positional relation between an extraction area 112, and the rails 101, the trolley wire 102, the rail plane 106, the railway center plane 110, a train 111, a point 113 on the trolley wire 102, and the like. The trolley-wire detection unit 30, which extracts from the storage unit 10 the point-group data 11 within the limited extraction area 112, can reduce the processing amount for detecting the point 113 on the trolley wire 102.

When a plurality of target objects is extracted from the area of the extracted point group 104 and the extracted target objects are arranged in the vertical direction, the trolley-wire detection unit 30 detects the lower one of the target objects as the point 113 on the trolley wire 102 because, in view of the overhead wire structure, the lower target object is regarded as the trolley wire 102 and the upper target object is regarded as the messenger wire 103 suspending the trolley wire 102. The trolley-wire detection unit 30 outputs the position of the detected point 113 on the trolley wire 102, that is, outputs information on the coordinate values of the point 113 on the trolley wire 102, to the height and displacement measurement unit 40.

Figure 10:
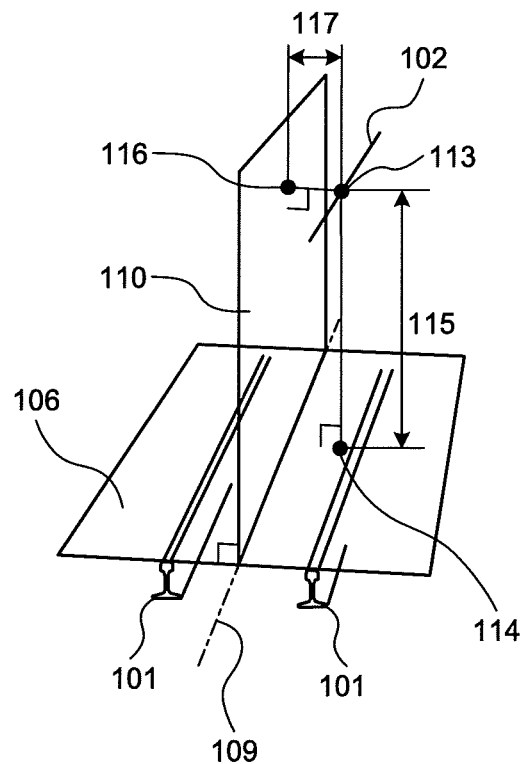
FIG. 10 is a diagram illustrating a height and a displacement of a point on a trolley wire which are measured by a height and displacement measurement unit according to the first embodiment.

The height and displacement measurement unit 40 uses the position of the point 113 on the trolley wire 102 obtained from the trolley-wire detection unit 30, the rail plane 106 that is a first reference, and the railway center plane 110 that is a second reference obtained from the reference setting unit 22, thereby measuring the height of the point 113 on the trolley wire 102 from the rail plane 106, and the displacement of the point 113 on the trolley wire 102 from the railway center plane 110. FIG. 10 is a diagram illustrating a height 115 and a displacement 117 of the point 113 on the trolley wire 102 which are measured by the height and displacement measurement unit 40 according to the first embodiment. The height and displacement measurement unit 40 defines the height 115 of the point 113 on the trolley wire 102 as a length from the point 113 on the trolley wire 102 to a foot 114 of the perpendicular extending to the rail plane 106. That is, the height and displacement measurement unit 40 defines the height 115 as a distance between the rail plane 106 and the point 113 on the trolley wire 102. Further, the height and displacement measurement unit 40 defines the displacement 117 of the point 113 on the trolley wire 102 as a length from the point 113 on the trolley wire 102 to a foot 116 of the perpendicular extending to the railway center plane 110. That is, the height and displacement measurement unit 40 defines the displacement 117 as a distance between the railway center plane 110 and the point 113 on the trolley wire 102.

Figure 11:
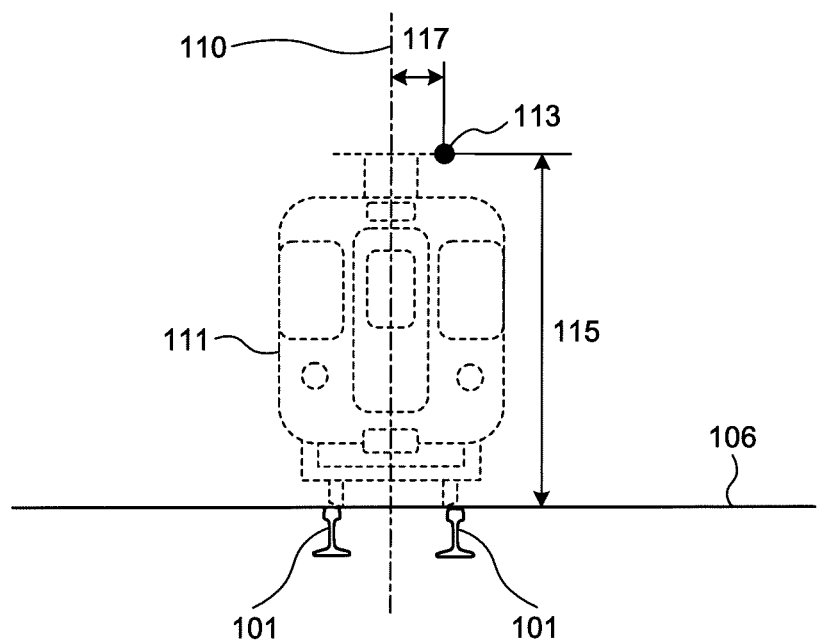
FIG. 11 is a diagram illustrating a positional relation between a train and a height and a displacement of a point on the trolley wire which have been measured by the height and displacement measurement unit according to the first embodiment.

FIG. 11 is a diagram illustrating a positional relation between the train 111 and the height 115 and the displacement 117 of the point 113 on the trolley wire 102 which have been measured by the height and displacement measurement unit 40 according to the first embodiment. By virtue of the height 115 and the displacement 117 of the point 113 on the trolley wire 102 which have been measured by the height and displacement measurement unit 40, personnel in charge of the railway facility maintenance can determine whether the position of the point 113 on the trolley wire 102 falls within a range specified by a railway company or the like, that is, whether the position of the point 113 on the trolley wire 102 agrees with the specified height 115 and the specified displacement 117. FIG. 12 is a diagram illustrating data on the height 115 and the displacement 117 of a point 113T$_i$ on the trolley wire 102 which have been measured by the height and displacement measurement unit 40 according to the first embodiment. The height and displacement measurement unit 40 additionally stores therein information on the measured height 115 and displacement 117 of the point 113T$_i$ on the trolley wire 102 in association with the positional information on the point 113T$_i$ on the trolley wire 102 obtained from the trolley-wire detection unit 30, that is, in association with the coordinate values of the point 113T$_i$ on the trolley wire 102.

The trolley-wire measurement device 1 performs a process of measuring the point 113 on the trolley wire 102 as is described next with reference to a flowchart. FIG. 13 is a flowchart illustrating a trolley-wire measuring process in the trolley-wire measurement device 1 according to the first embodiment. In the trolley-wire measurement device 1, first, the railway measurement unit 20 and the trolley-wire detection unit 30 read the point-group data 11 obtained through plural scans from the storage unit 10 (Step S1). In general, a measuring device, having generated the point-group data 11 on the basis of three-dimensional measurement, scans a target object as the measuring device is mounted on a vehicle moving on a railway. The point-group data 11 obtained through the plural scans is, for example, data on a group of points with a dimension in the depth direction in three dimensions in FIG. 2 that is the traveling direction of a vehicle.

The railway measurement unit 20 derives the rail plane 106, the railway center line 109, and the railway center plane 110 from the read point-group data 11 (Step S2).

Figure 14:
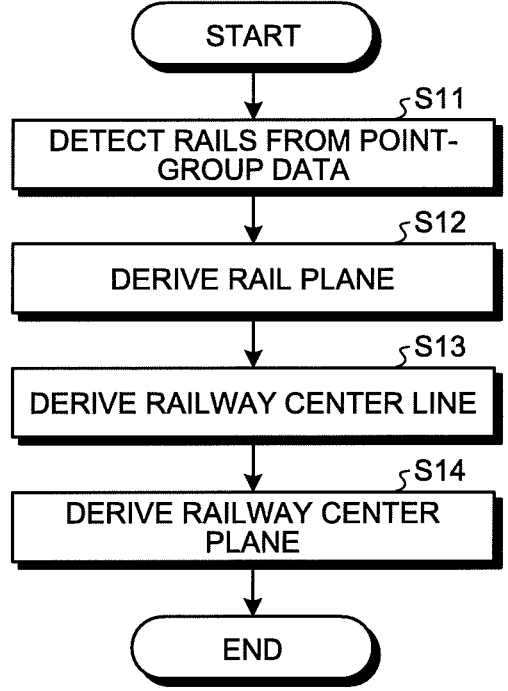
FIG. 14 is a flowchart illustrating a process in a railway measurement unit according to the first embodiment.

FIG. 14 is a flowchart illustrating a process in the railway measurement unit 20 according to the first embodiment. In the railway measurement unit 20, first, the rail detection unit 21 detects the rails 101 from the read point-group data 11 (Step S11). Next, the reference setting unit 22 derives the rail plane 106 on the basis of the rails 101 detected by the rail detection unit 21 (Step S12). Then, the reference setting unit 22 derives the railway center line 109 on the rail plane 106 (Step S13). Finally, the reference setting unit 22 derives the railway center plane 110 which is located on the railway center line 109 and orthogonal to the rail plane 106 (Step S14). The rail detection unit 21 detects the rails 101 through the process as discussed above. The reference setting unit 22 derives the rail plane 106, the railway center line 109, and the railway center plane 110 through the process as described above.

Referring back to the flowchart in FIG. 13, the trolley-wire detection unit 30 detects the point 113 on the trolley wire 102 from the read point-group data 11 (Step S3). The trolley-wire detection unit 30 detects the point 113 on the trolley wire 102 through the process as described above.

The height and displacement measurement unit 40 obtains the rail plane 106 and the railway center plane 110 from the railway measurement unit 20, and obtains the position of the point 113 on the trolley wire 102 from the trolley-wire detection unit 30. The height and displacement measurement unit 40 extracts one of unprocessed points 113 on the trolley wire 102 (Step S4).

The height and displacement measurement unit 40 measures the distance between the rail plane 106 and the point 113 on the trolley wire 102, as the height 115 of the point 113 on the trolley wire 102 (Step S5).

The height and displacement measurement unit 40 measures the distance between the railway center plane 110 and the point 113 on the trolley wire 102, as the displacement 117 of the point 113 on the trolley wire 102 (Step S6).

When an unprocessed point on the trolley wire 102 having the height 115 and displacement 117 not yet derived exists (YES at Step S7), the process returns to Step S4 such that the height and displacement measurement unit 40 repeatedly executes the processes from Steps S4 to S6.

When an unprocessed point on the trolley wire 102 having height 115 and displacement 117 not yet derived does not exist (NO at Step S7), the height and displacement measurement unit 40 ends the measuring process.

Figure 15:
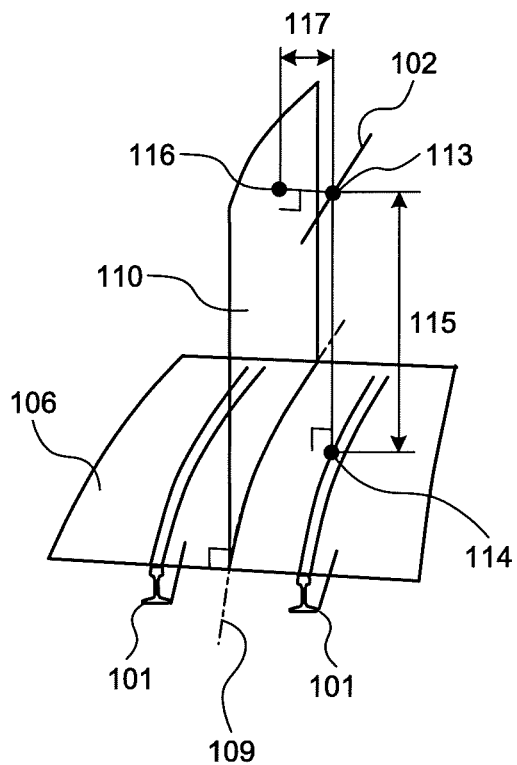
FIG. 15 is a diagram illustrating a height and a displacement of a point on the trolley wire which are measured by the height and displacement measurement unit according to the first embodiment in a case where rails are curved.

Although the present embodiment has been described by way of example with reference to the rails 101 that are straight as illustrated in FIG. 10 and other diagrams, the present invention is also applicable to the rails 101 that are curved. FIG. 15 is a diagram illustrating the height 115 and the displacement 117 of the point 113 on the trolley wire 102 which are measured by the height and displacement measurement unit 40 according to the first embodiment in a case where the rails 101 are curved. Even in the case where the rails 101 are curved, the height and displacement measurement unit 40 can still measure a distance from the point 113 on the trolley wire 102 to the rail plane 106, as the height 115 of the point 113 on the trolley wire 102, and measure a distance from the point 113 on the trolley wire 102 to the railway center plane 110, as the displacement 117 of the point 113 on the trolley wire 102. The same applies to other embodiments to be described later.

Figure 16:
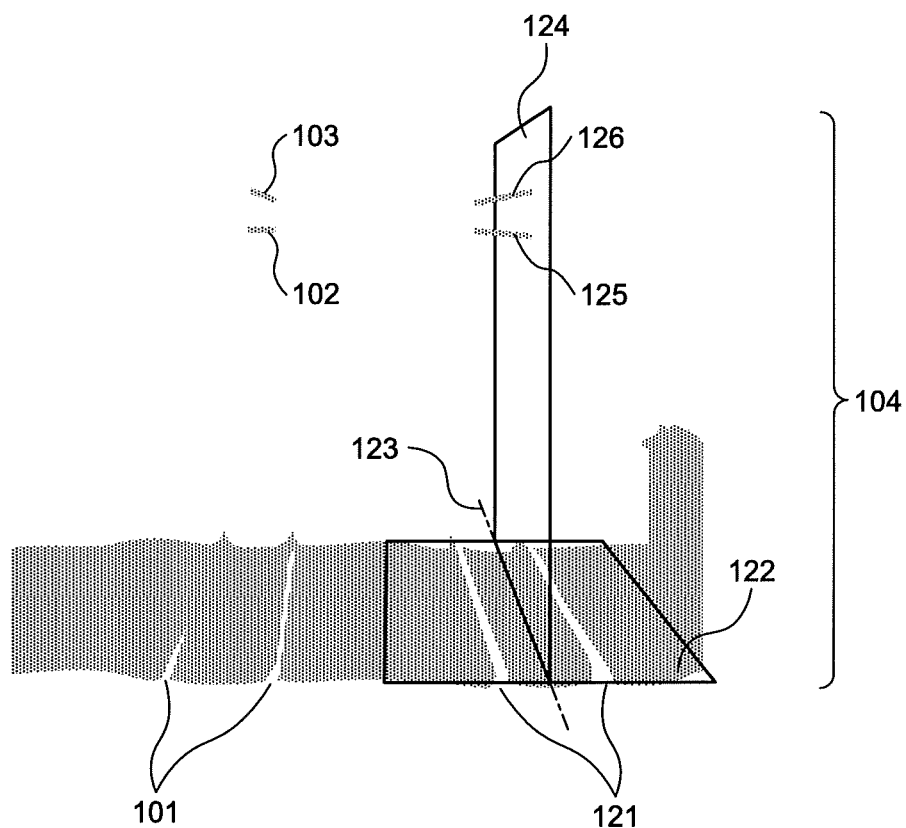
FIG. 16 is a diagram illustrating a rail plane, a railway center line, and a railway center plane of a parallel railway, which are derived by the reference setting unit according to the first embodiment.

The trolley-wire measurement device 1 as discussed above measures the height 115 and the displacement 117 of the point 113 on the trolley wire 102 for one railway. When there is another railway running in parallel to the one railway, the trolley-wire measurement device 1 is also capable of measuring the height and the displacement of a point on a trolley wire for the rails of the parallel railway. When the point-group data 11 stored in the storage unit 10 includes point-group data regarding a plurality of railways, as illustrated in FIG. 8, the trolley-wire measurement device 1 is also capable of deriving rails, a rail plane, a railway center line, and a railway center plane for the right railway running in parallel to the left railway as illustrated in FIG. 8, as with the left railway, thereby measuring the height and the displacement of a point on a trolley wire for the parallel railway. FIG. 16 is a diagram illustrating a rail plane 122, a railway center line 123, and a railway center plane 124 for the parallel railway, which are derived by the reference setting unit 22 according to the first embodiment. FIG. 16 illustrates a positional relation between rails 121, the rail plane 122, the railway center line 123, the railway center plane 124, a trolley wire 125, and a messenger wire 126 for the parallel railway. For example, in FIG. 8 and FIG. 16, when a measuring device having generated the point-group data 11 through three-dimensional measurement is mounted on a vehicle running on the left railway, the trolley-wire measurement device 1 is also capable of deriving the rail plane 122, the railway center line 123, and the railway center plane 124 on the basis of the rails 121 for the right, parallel railway running in parallel to the left railway, thereby measuring the height and the displacement of a point on the trolley wire 125.

Further, at a crossover section where a plurality of railways branch off or join together, the trolley-wire measurement device 1 is also capable of deriving rails, a rail plane, a railway center line, and a railway center plane for each of the main and side railways, thereby measuring the height and the displacement of a point on a trolley wire on the basis of the rails of each of the main and side railways.

When the point-group data 11 includes points regarding a plurality of railways, the rail detection unit 21 detects rails on a railway-by-railway basis. The reference setting unit 22 derives a rail plane, a railway center line, and a railway center plane on a railway-by-railway basis, and outputs the first reference and the second reference for each railway, to the height and displacement measurement unit 40. The trolley-wire detection unit 30 detects a point on a trolley wire on a railway-by-railway basis. The height and displacement measurement unit 40 measures the height and the displacement of the point on the trolley wire on a railway-by-railway basis.

Although the trolley-wire measurement device 1 discussed above obtains the entire image of the trolley wire 102, and measures the height 115 and the displacement 117 of the point 113 on the trolley wire 102, the trolley-wire measurement device 1 is not limited to this approach. For example, the trolley-wire measurement device 1 may approximate a combination of straight lines from the point group 104 to provide the trolley wire 102, thereby measuring the height 115 and the displacement 117 of the point 113 that is the vertex point of the trolley wire 102 resulting from the approximation. Such an approach enables the trolley-wire measurement device 1 to measure the height 115 and the displacement 117 of the point 113 on the trolley wire 102, as with the case of obtaining the entire image of the trolley wire 102 to measure the height 115 and the displacement 117 of the point 113 on the trolley wire 102. For the trolley-wire measurement device 1, the volume of the point-group data 11 to be used can be reduced to thereby reduce the amount processed in measuring the height 115 and the displacement 117 of the point 113 on the trolley wire 102. As a result, the capacity of the storage unit 10 that stores therein the point-group data 11 can be small.

Next, a hardware configuration of the trolley-wire measurement device 1 is described. In the trolley-wire measurement device 1, the storage unit 10 is implemented by a memory. Each of the functions of the railway measurement unit 20 defined by the rail detection unit 21 and the reference setting unit 22, the trolley-wire detection unit 30, and the height and displacement measurement unit 40 is implemented by a processing circuit. That is, the trolley-wire measurement device 1 includes a processing circuit to detect the rails 101 from the point-group data 11, derive the rail plane 106, the railway center line 109, and the railway center plane 110, detect the point 113 on the trolley wire 102 from the point-group data 11, and measure the height 115 and the displacement 117 of the point 113 on the trolley wire 102. The processing circuit may be dedicated hardware, or a memory and a Central Processing Unit (CPU) that executes a program stored in the memory.

Figure 17:
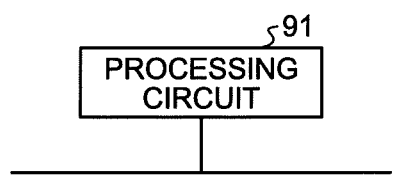
FIG. 17 is a diagram illustrating an example in which a processing circuit of the trolley-wire measurement device according to the first embodiment is defined by dedicated hardware.

FIG. 17 is a diagram illustrating an example in which the processing circuit of the trolley-wire measurement device 1 according to the first embodiment is defined by the dedicated hardware. When the processing circuit is the dedicated hardware, then for example, a single circuit, a combined circuit, a programmed processor, a parallel-programmed processor, an Application Specific Integrated Circuit (ASIC), a Field Programmable Gate Array (FPGA), or a combination thereof is equivalent to a processing circuit 91 illustrated in FIG. 17. Each of the functions of the railway measurement unit 20, the trolley-wire detection unit 30, and the height and displacement measurement unit 40 may be implemented by the processing circuit 91, or these respective functions may be implemented together by the processing circuit 91.

Figure 18:
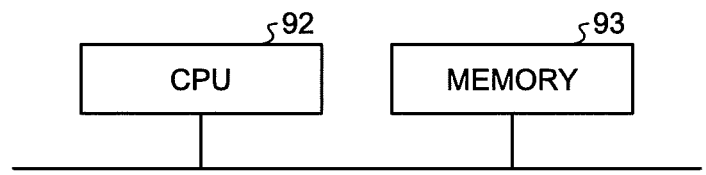
FIG. 18 is a diagram illustrating an example in which the processing circuit of the trolley-wire measurement device according to the first embodiment is defined by a CPU and a memory.

FIG. 18 is a diagram illustrating an example in which the processing circuit of the trolley-wire measurement device 1 according to the first embodiment is defined by a CPU and a memory. In a case where the processing circuit is defined by a CPU 92 and a memory 93, the functions of the railway measurement unit 20, the trolley-wire detection unit 30, and the height and displacement measurement unit 40 are implemented by software, firmware, or a combination thereof. The software or the firmware is described as a program and stored in the memory 93. In the processing circuit, the CPU 92 reads and executes the program stored in the memory 93, thereby implementing the function of each unit. That is, the trolley-wire measurement device 1 includes the memory 93 that stores therein programs executed by the processing circuit to perform a step of detecting the rails 101 from the point-group data 11, a step of deriving the rail plane 106, a step of deriving the railway center line 109, a step of deriving the railway center plane 110, a step of detecting the point 113 on the trolley wire 102 from the point-group data 11, and a step of measuring the height 115 and the displacement 117 of the point 113 on the trolley wire 102. These programs are also regarded as causing a computer to execute the procedures and methods performed by the railway measurement unit 20, the trolley-wire detection unit 30, and the height and displacement measurement unit 40. The CPU 92 can be a processing device, an arithmetic device, a microprocessor, a microcomputer, a processor, or a DSP (Digital Signal Processor). A nonvolatile or volatile semi-conductor memory such as a RAM (Random Access Memory), a ROM (Read Only Memory), a flash memory, an EPROM (Erasable Programmable ROM), and an EEPROM (Electrically EPROM), a magnetic disk, a flexible disk, an optical disk, a compact disk, a mini disk, or a DVD (Digital Versatile Disc), and the like correspond to the memory 93. A memory that implements the storage unit 10 can be used as the memory 93.

The respective functions of the railway measurement unit 20, the trolley-wire detection unit 30, and the height and displacement measurement unit 40 may be partially implemented by dedicated hardware, and be partially implemented by software or firmware. For example, the respective functions of the railway measurement unit 20 and the trolley-wire detection unit 30 can be implemented by the processing circuit 91 that serves as the dedicated hardware, and the CPU 92 can read and execute the program stored in the memory 93 to implement the function of the height and displacement measurement unit 40.

In this manner, the processing circuit can implement the respective functions described above by the dedicated hardware, the software, the firmware, or the combination thereof.

As described above, according to the present embodiment, the trolley-wire measurement device 1 detects the rails 101 from the point-group data 11 that is an aggregate of points obtained by measuring a target object three-dimensionally, derives the rail plane 106, the railway center line 109, and the railway center plane 110 on the basis of the detected rails 101, and detects the point 113 on the trolley wire 102 from the point-group data 11 to measure a distance between the rail plane 106 and the point 113 on the trolley wire 102, as the height 115 of the point 113 on the trolley wire 102, and measure a distance between the railway center plane 110 and the point 113 on the trolley wire 102, as the displacement 117 of the point 113 on the trolley wire 102. That is, the trolley-wire measurement device 1 can detect the rails 101 and the point 113 on the trolley wire 102 from the same point-group data 11, and can measure the height 115 and the displacement 117 of the point 113 on the trolley wire 102 on the basis of the reference set on the railway, that is, on the basis of the detected rails 101. Thus, since the relative positions of the rails 101 and the point 113 on the trolley wire 102 are accurate, the trolley-wire measurement device 1 can accurately measure the height 115 and the displacement 117 of the point 113 on the trolley wire 102.

Further, since the trolley-wire measurement device 1 detects the rails 101 and the point 113 on the trolley wire 102 from the same point-group data 11 and uses the detected rails 101 and the detected point 113, the trolley-wire measurement device 1 can accurately measure the height 115 and the displacement 117 of the point 113 on the trolley wire 102 even when a vehicle on which the measuring device having generated the point-group data 11 is mounted sways or oscillates during the three-dimensional measurement, or when the railway is curved.

Furthermore, when the point-group data 11 includes the point-group data regarding a plurality of railways, the trolley-wire measurement device 1 can measure the height and the displacement of a point on a trolley wire for the respective railways in the same manner, and thus can measure the height and the displacement of a point on a trolley wire for each of the parallel railways or each of the main and side railways at the crossover. The trolley-wire measurement device 1 can efficiently measure the height and the displacement of a point on a trolley wire on a plurality of railways.

Second Embodiment

In the first embodiment, the reference setting unit 22 derives the railway center plane 110. In a second embodiment, a method of measuring the displacement 117 of the point 113 on the trolley wire 102 without deriving the railway center plane 110 is described.

A configuration of the trolley-wire measurement device 1 according to the second embodiment is identical to that in the first embodiment (see FIG. 1). In the present embodiment, the reference setting unit 22 does not derive the railway center plane 110, and instead, outputs to the height and displacement measurement unit 40 the rail plane 106 as a first reference and the railway center line 109 as a second reference.

Figure 19:
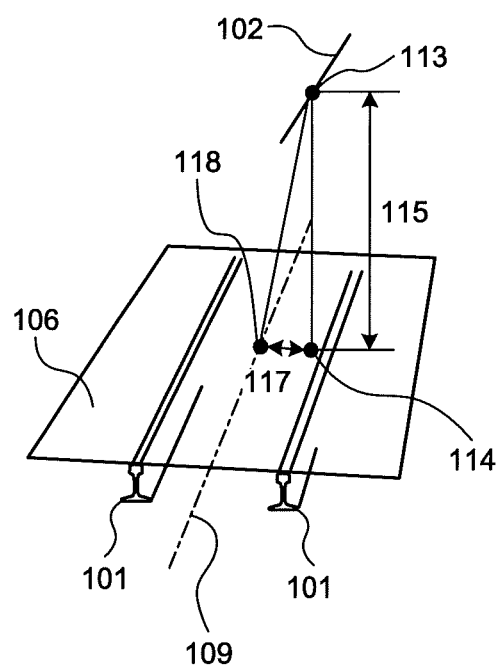
FIG. 19 is a diagram illustrating a height and a displacement of a point on a trolley wire which are measured by a height and displacement measurement unit according to a second embodiment.

The height and displacement measurement unit 40 measures the height 115 of the point 113 on the trolley wire 102 by using the method identical to that in the first embodiment. In the present embodiment, the height and displacement measurement unit 40 measures a distance between the railway center line 109 and the foot 114 of the perpendicular extending from the point 113 on the trolley wire 102 to the rail plane 106, the measured distance being defined as the displacement 117 of the point 113 on the trolley wire 102. For example, the height and displacement measurement unit 40 measures a distance between the foot 114 of the perpendicular extending from the point 113 on the trolley wire 102 to the rail plane 106, and a foot 118 of the perpendicular extending from the point 113 on the trolley wire 102 to the railway center line 109, the measured distance being defined as the displacement 117 of the point 113 on the trolley wire 102. FIG. 19 is a diagram illustrating the height 115 and the displacement 117 of the point 113 on the trolley wire 102 which are measured by the height and displacement measurement unit 40 according to the second embodiment. In this manner, the height and displacement measurement unit 40 can measure the displacement 117 of the point 113 on the trolley wire 102 by using only the rail plane 106 and the railway center line 109 which have been obtained from the reference setting unit 22.

Figure 20:
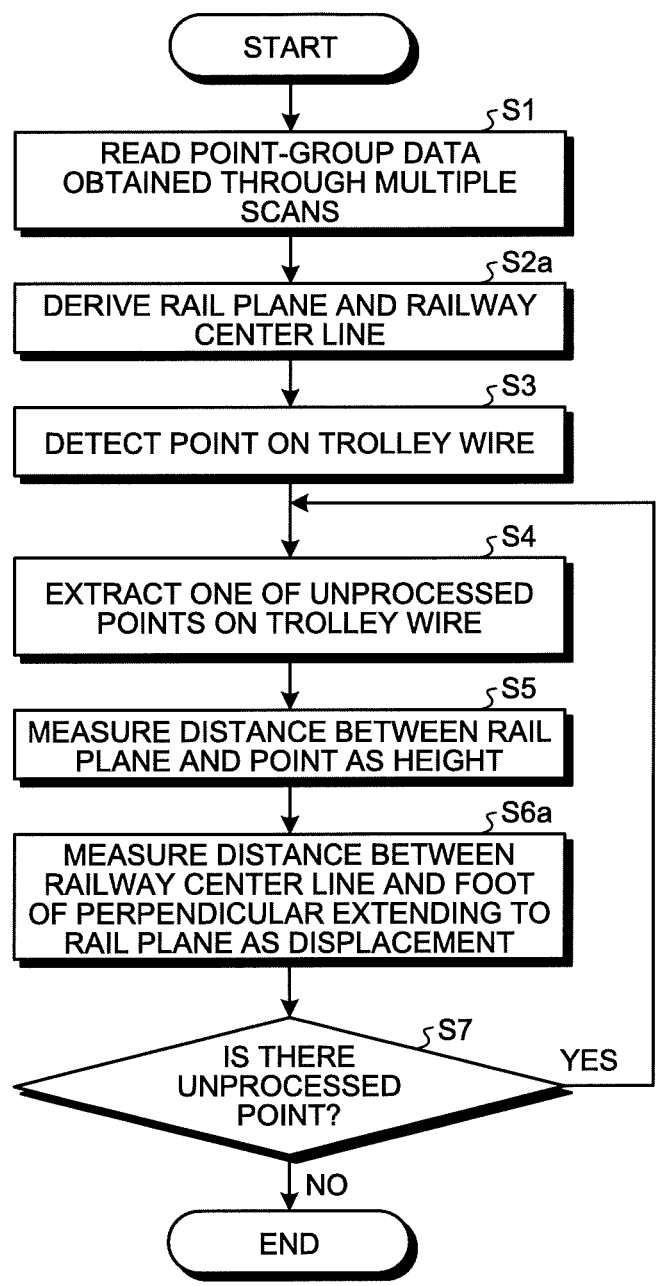
FIG. 20 is a flowchart illustrating a trolley-wire measuring process in a trolley-wire measurement device according to the second embodiment.
Figure 21:
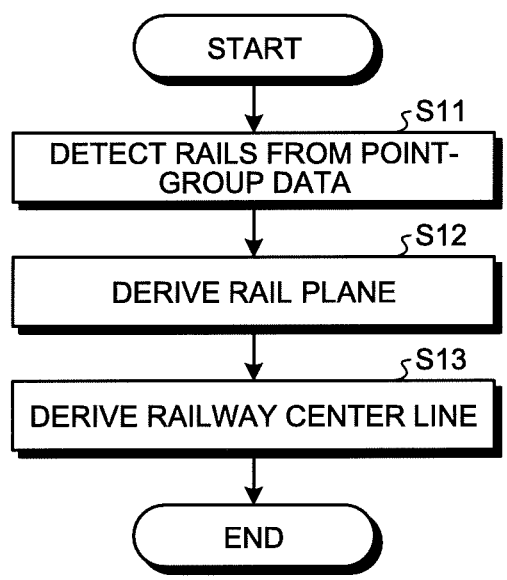
FIG. 21 is a flowchart illustrating a process in a railway measurement unit according to the second embodiment.

FIG. 20 is a flowchart illustrating a trolley-wire measuring process in the trolley-wire measurement device 1 according to the second embodiment. The process at Step S1 is identical to the process in the first embodiment. The railway measurement unit 20 derives the rail plane 106 and the railway center line 109 from the read point-group data 11 (Step S2a). FIG. 21 is a flowchart illustrating a process in the railway measurement unit 20 according to the second embodiment. The flowchart of FIG. 21 does not include the process at Step S14 of the flowchart according to the first embodiment illustrated in FIG. 14, and includes processes at Steps S11 to S13 of the flowchart of FIG. 21 that are identical to those in the first embodiment. A process at Step S3 of FIG. 20 is identical to the process in the first embodiment.

Processes at Steps S4 and S5 in the height and displacement measurement unit 40 are identical to those in the first embodiment. The height and displacement measurement unit 40 measures a distance between the railway center line 109 and the foot 114 of the perpendicular extending from the point 113 on the trolley wire 102 to the rail plane 106, the measured distance being defined as the displacement 117 of the point 113 on the trolley wire 102 (Step S6a). A process at Step S7 in the height and displacement measurement unit 40 is identical to the process in the first embodiment.

When the point-group data 11 includes points regarding a plurality of railways, the rail detection unit 21 detects rails on a railway-by-railway basis. The reference setting unit 22 derives a rail plane and a railway center line on a railway-by-railway basis, and outputs the first reference and the second reference for each railway, to the height and displacement measurement unit 40. The trolley-wire detection unit 30 detects a point on a trolley wire on a railway-by-railway basis. The height and displacement measurement unit 40 measures the height and the displacement of the point on the trolley wire on a railway-by-railway basis.

As described above, according to the present embodiment, the trolley-wire measurement device 1 detects the rails 101 from the point-group data 11, derives the rail plane 106 and the railway center line 109 on the basis of the detected rails 101, and detects the point 113 on the trolley wire 102 from the point-group data 11 to measure a distance between the rail plane 106 and the point 113 on the trolley wire 102, as the height 115 of the point 113 on the trolley wire 102, and to measure a distance between the railway center line 109 and the foot 114 of the perpendicular extending from the point 113 on the trolley wire 102 to the rail plane 106, as the displacement 117 of the point 113 on the trolley wire 102. Also in this case, effects identical to those of the first embodiment can be obtained.

Third Embodiment

In the first and second embodiments, the description has been made as to measuring the height 115 and the displacement 117 of the point 113 on the trolley wire 102 by using the point-group data 11 measured in advance. In a third embodiment, a description is made as to measuring the height 115 and the displacement 117 of the point 113 on the trolley wire 102 by using point-group data on a target object that is measured three-dimensionally in real time.

Figure 22:
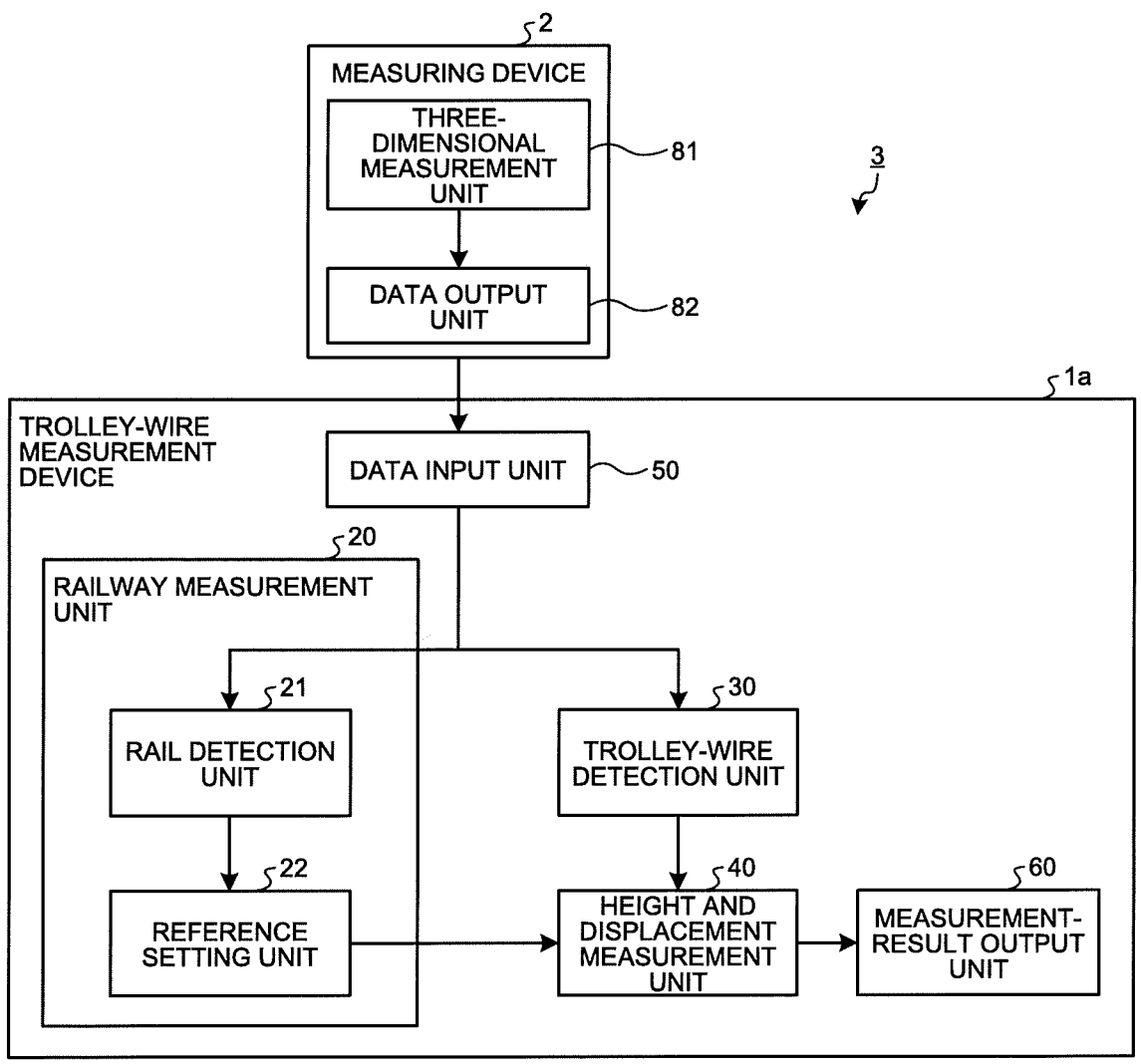
FIG. 22 is a block diagram illustrating a configuration example of a trolley-wire measurement system including a trolley-wire measurement device and a measuring device according to a third embodiment.

FIG. 22 is a block diagram illustrating a configuration example of a trolley-wire measurement system 3 including a trolley-wire measurement device 1a and a measuring device 2 according to the third embodiment. The trolley-wire measurement system 3 includes the trolley-wire measurement device 1a and the measuring device 2. The measuring device 2, which is mounted on a vehicle, three-dimensionally measures target objects including the rails 101, the trolley wire 102, and the like as the measuring device 2 moves with the running vehicle.

The measuring device 2 includes a three-dimensional measurement unit 81 and a data output unit 82.

The three-dimensional measurement unit 81 measures a target object three-dimensionally by using the MMS described above, and outputs to the data output unit 82 the point-group data obtained by the three-dimensional measurement.

The data output unit 82 outputs to the trolley-wire measurement device 1a the obtained point-group data measured three-dimensionally in the three-dimensional measurement unit 81. The data output unit 82 can transmit the point-group data to the trolley-wire measurement device 1a through, for example, wireless communication or wire communication. However, the data transmission method is not limited thereto. The data output unit 82 may output the point-group data to the trolley-wire measurement device 1a via a recording medium.

The trolley-wire measurement device 1a is configured by removing the storage unit 10 from the trolley-wire measurement device 1, and adding a data input unit 50 and a measurement-result output unit 60 thereto.

The data input unit 50 obtains the point-group data from the measuring device 2 that measures a target object three-dimensionally. The data input unit 50 can receive the point-group data from the measuring device 2 through, for example, wireless communication or wire communication. However, the data reception method is not limited thereto. The data input unit 50 may obtain the point-group data from the measuring device 2 via a recording medium.

The measurement-result output unit 60 outputs a measurement result of the height 115 and the displacement 117 of the point 113 on the trolley wire 102 which have been measured by the height and displacement measurement unit 40. The measurement-result output unit 60 is, for example, a display device that displays the measurement result, a printing device that prints the measurement result, or an interface that outputs the measurement result to a recording medium. However, the measurement-result output unit 60 is not limited thereto. The measurement-result output unit 60 may output, for example, information on the coordinate values, the height 115, and the displacement 117 of the point 113$T_i$ on the trolley wire 102 illustrated in FIG. 12 as a measurement result. The measurement-result output unit 60 may be added to the trolley-wire measurement device 1 illustrated in FIG. 1. That is, in the first and second embodiments, the measurement-result output unit 60 may output a measurement result of the height 115 and the displacement 117 of the point 113 on the trolley wire 102 which have been measured by the height and displacement measurement unit 40.

Figure 23:
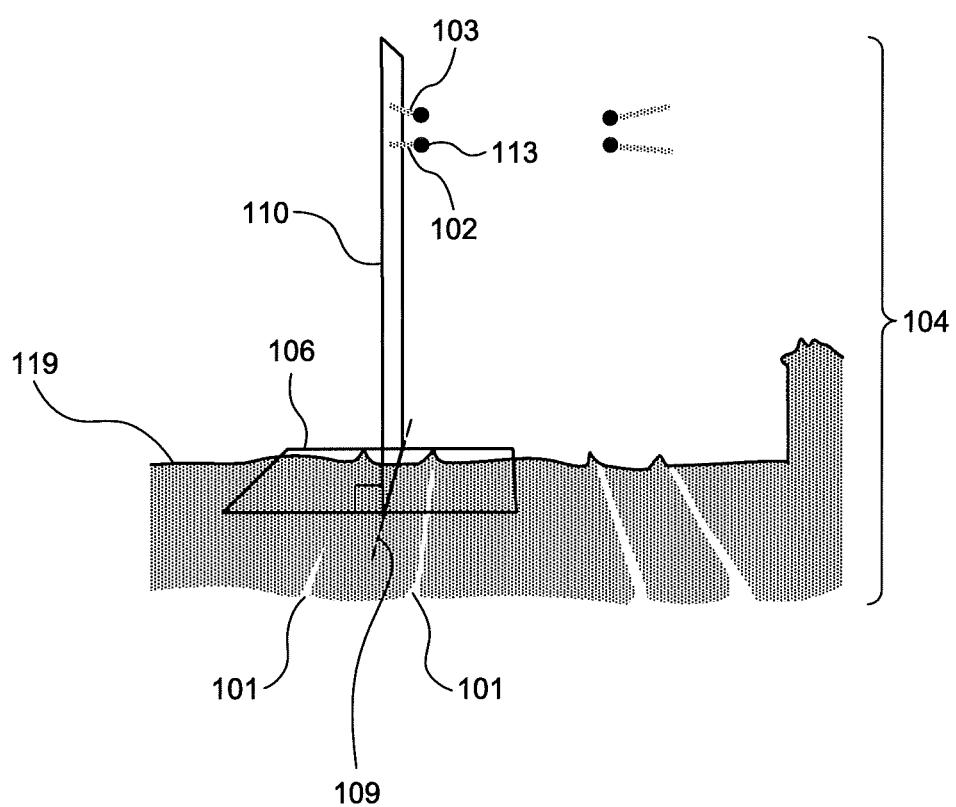
FIG. 23 is a diagram illustrating rails, a trolley wire, and the like expressed by point-group data measured three-dimensionally by the measuring device according to the third embodiment.

FIG. 23 is a diagram illustrating the rails 101, the trolley wire 102, and the like expressed by point-group data measured three-dimensionally by the measuring device 2 according to the third embodiment. In the third embodiment, the measuring device 2 is defined as being mounted on a vehicle (not illustrated) and measuring a target object three-dimensionally as the measuring device 2 moves in the depth direction in three dimensions in FIG. 23. In FIG. 23, a section illustrated by a point group 119 obtained through the latest scan is the latest point group measured three-dimensionally by the measuring device 2. In the trolley-wire measurement device 1a, the rail detection unit 21 can detect the rails 101 from the point group 119 obtained through the latest scan. The trolley-wire detection unit 30 can detect the point 113 on the trolley wire 102 from the point group 119 obtained through the latest scan.

Meanwhile, when the reference setting unit 22 derives the rail plane 106, the railway center line 109, and the railway center plane 110 on the basis of the rails 101 detected by the rail detection unit 21 from the data on the point group 119 obtained through the latest scan, these derived rail plane 106, railway center line 109, and railway center plane 110 may include an error. Thus, the reference setting unit 22 derives the rail plane 106, the railway center line 109, and the railway center plane 110 on the basis of the rails 101 detected using data on the point group 104 obtained through most recent plural scans, the point group 104 including the point group 119 obtained through the latest scan. The reference setting unit 22 stores therein information on the rails 101 detected using the data on the point group 104 obtained through the most recent plural scans. For example, the reference setting unit 22 stores therein information on the rail points 107.

In the trolley-wire measurement device 1a, the rail detection unit 21 updates the position of the rails 101 each time the rail detection unit 21 obtains data on the point group 119 detected through the latest scan from the measuring device 2. The trolley-wire detection unit 30 updates the point 113 on the trolley wire 102 each time the trolley-wire detection unit 30 obtains data on the point group 119 detected through the latest scan from the measuring device 2. Each time the rail detection unit 21 updates the position of the rails 101, the reference setting unit 22 updates the rail plane 106, the railway center line 109, and the railway center plane 110 on the basis of the rails 101 detected from the data on the point group 104 obtained through plural scans including the latest and previous scans.

Figure 24:
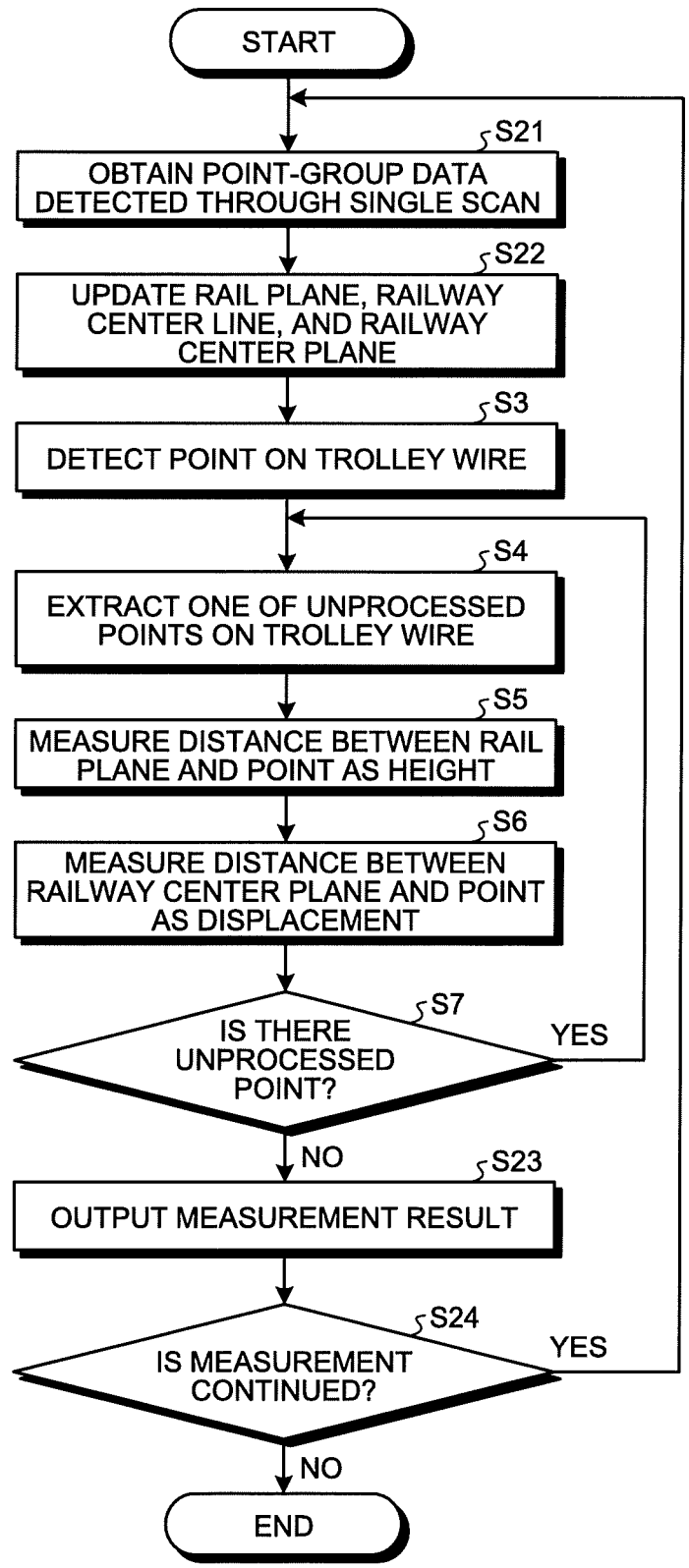
FIG. 24 is a flowchart illustrating a trolley-wire measuring process in the trolley-wire measurement device according to the third embodiment.

The trolley-wire measurement device 1a measures the point 113 on the trolley wire 102 through a process described next with reference to a flowchart. FIG. 24 is a flowchart illustrating the trolley-wire measuring process in the trolley-wire measurement device 1a according to the third embodiment. First, in the trolley-wire measurement device 1a, the railway measurement unit 20 and the trolley-wire detection unit 30 obtain the point-group data detected through a single scan from the measuring device 2 via the data input unit 50 (Step S21).

The railway measurement unit 20 updates the rail plane 106, the railway center line 109, and the railway center plane 110 by using the obtained point-group data (Step S22).

Figure 25:
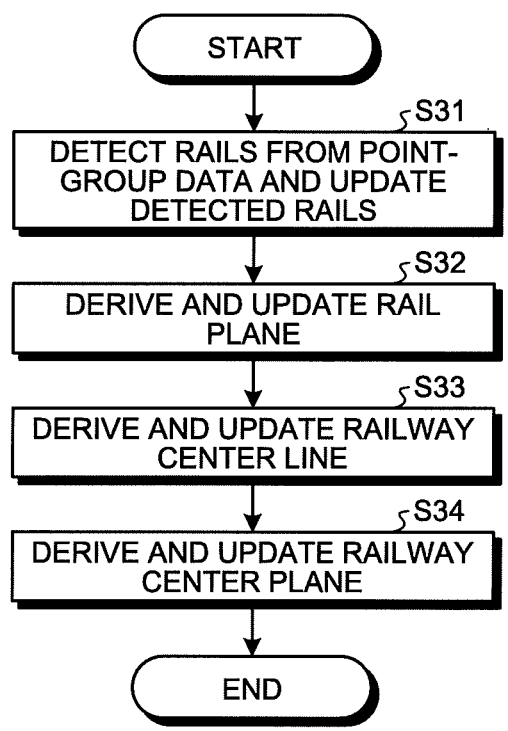
FIG. 25 is a flowchart illustrating a process in a railway measurement unit according to the third embodiment.

FIG. 25 is a flowchart illustrating a process in the railway measurement unit 20 according to the third embodiment. In the railway measurement unit 20, first, the rail detection unit 21 detects and updates the rails 101 from the obtained point-group data (Step S31). Next, the reference setting unit 22 derives and updates the rail plane 106 on the basis of the rails 101 detected and updated by the rail detection unit 21 and the rails 101 detected through the multiple previous scans (Step S32). Then, the reference setting unit 22 derives and updates the railway center line 109 on the rail plane 106 (Step S33). The reference setting unit 22 then derives and updates the railway center plane 110 which is located on the railway center line 109 and orthogonal to the rail plane 106 (Step S34).

Referring back to the flowchart in FIG. 24, the trolley-wire detection unit 30 detects the point 113 on the trolley wire 102 from the obtained point-group data (Step S3). The trolley-wire detection unit 30 detects the trolley wire 102 and the point 113 on the trolley wire 102 through the process identical to the process in the first embodiment except that the number of pieces of point-group data to be used in Step 3 of the flowchart of FIG. 24 is different from that in the first embodiment.

The processes at Steps S4 to S7 in the height and displacement measurement unit 40 are identical to those in the first embodiment.

When the height and displacement measurement unit 40 outputs a measurement result of the height 115 and the displacement 117 of the point 113 on the trolley wire 102 to the measurement-result output unit 60, the measurement-result output unit 60 outputs the measurement result of the height 115 and the displacement 117 of the point 113 on the trolley wire 102 on a display or the like (Step S23). As a result, personnel in charge of maintenance or the like can check the measurement result of the height 115 and the displacement 117 of the point 113 on the trolley wire 102 in real time.

When the trolley-wire measurement device 1a continues the measurement of the trolley wire 102 (YES at Step S24), the process returns to Step S21 such that the trolley-wire measurement device 1a repeatedly executes the processes described above. When the trolley-wire measurement device 1a terminates the measurement of the trolley wire 102 (NO at Step S24), the trolley-wire measurement device 1a ends the process.

Although the present embodiment has been described using, by way of example, the first embodiment, the present embodiment can be also applied to the second embodiment.

In a hardware configuration of the trolley-wire measurement device 1a, the data input unit 50 is configured by an interface circuit or the like that receives data input from a recording medium, a wire communication device, and a wireless communication device. The measurement-result output unit 60 is configured by an interface circuit or the like that outputs data to a recording medium, a printer, and a monitor. Individual configurations of the railway measurement unit 20, the trolley-wire detection unit 30, and the height and displacement measurement unit 40 are identical to those in the first embodiment, respectively.

As described above, according to the present embodiment, the trolley-wire measurement device 1a obtains point-group data from the measuring device 2 in real time, detects the rails 101 by using the obtained point-group data, derives the rail plane 106, the railway center line 109, and the railway center plane 110, detects the point 113 on the trolley wire 102 from the point-group data, measures the height 115 and the displacement 117 of the point 113 on the trolley wire 102, and outputs the measurement result of the height 115 and the displacement 117 of the point 113 on the trolley wire 102. Accordingly, the trolley-wire measurement device 1a can achieve the identical effects to those obtained in the first embodiment, and further can output the measurement result of the height 115 and the displacement 117 of the point 113 on the trolley wire 102 to the personnel in charge of maintenance or the like in real time.

Fourth Embodiment

In a fourth embodiment, a description is made as to detecting the messenger wire 103, a hanger wire between the messenger wire 103 and the trolley wire 102, a fitting that supports the messenger wire 103, and the like, all of which define the overhead wire together with the trolley wire 102.

Figure 26:
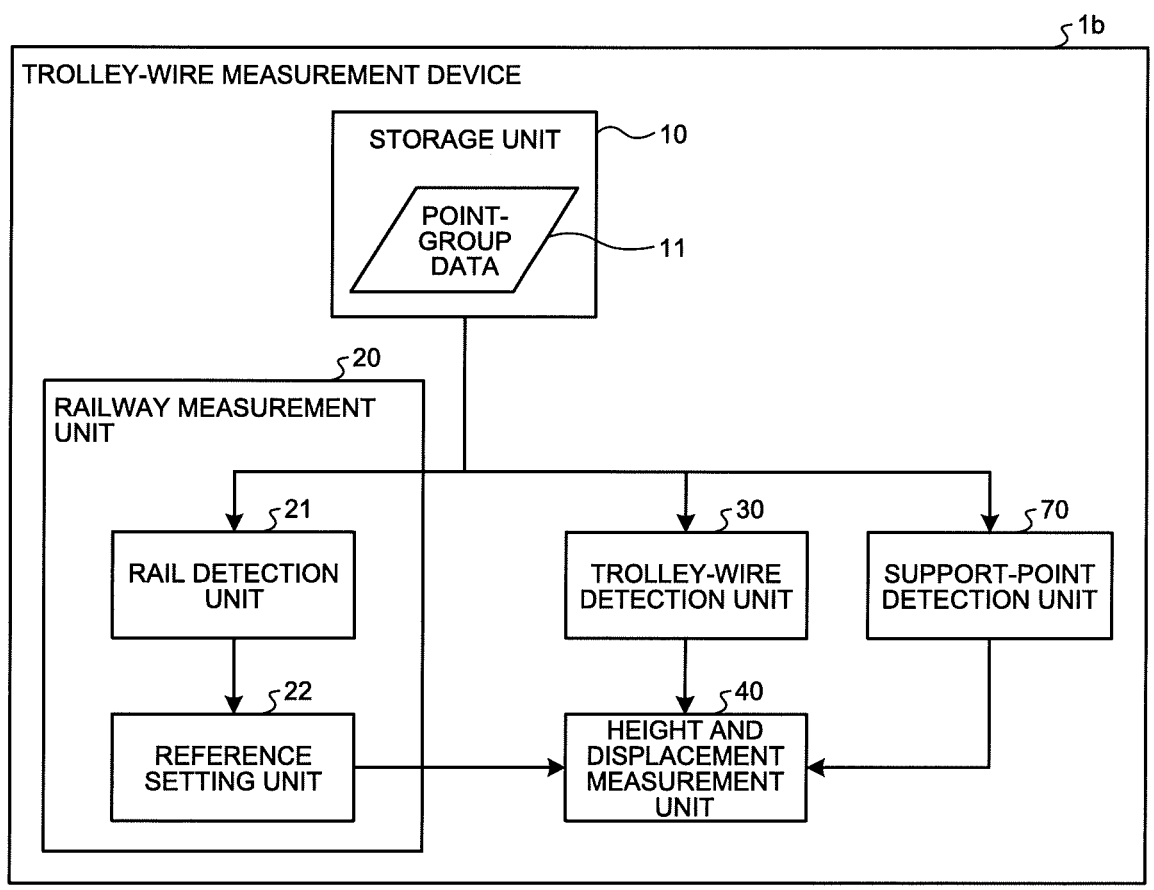
FIG. 26 is a block diagram illustrating a configuration example of a trolley-wire measurement device according to a fourth embodiment.

FIG. 26 is a block diagram illustrating a configuration example of a trolley-wire measurement device 1b according to the fourth embodiment. The trolley-wire measurement device 1b is configured by adding a support-point detection unit 70 to the configuration of the trolley-wire measurement device 1.

The support-point detection unit 70 detects from the point-group data 11 stored in the storage unit 10 a point on the messenger wire 103, a point on the hanger wire, and a point on the fitting, the messenger wire 103, the hanger wire, and the fitting being arranged to support the trolley wire 102. Within the target extraction area 112 illustrated in FIG. 9, the support-point detection unit 70 can detect, for example, the point above the trolley wire 102 as the messenger wire 103, and the point between the trolley wire 102 and the messenger wire 103 as the hanger wire, as with the process of detecting the trolley wire 102 in the trolley-wire detection unit 30. Further, the support-point detection unit 70 can further detect the fitting by, for example, performing matching between the detected points and a template expressing the shape of the fitting, as with the manner of detecting the rails 101 in the rail detection unit 21. The process of detecting the messenger wire 103, the hanger wire, and the fitting in the support-point detection unit 70 described above is merely an example, and the process is not limited thereto.

In the trolley-wire measurement device 1b, the height and displacement measurement unit 40 uses the respective positions of the messenger wire 103, the hanger wire, and the fitting which have been detected by the support-point detection unit 70. As a result, the measurement result of the height 115 and the displacement 117 of the trolley wire 102 can incorporate therein the information regarding whether the point 113 on the trolley wire 102 is at a section where there is the fitting, or at a section where there is the hanger wire. Thus, the information useful for the personnel in charge of the maintenance personnel can be provided.

Figure 27:
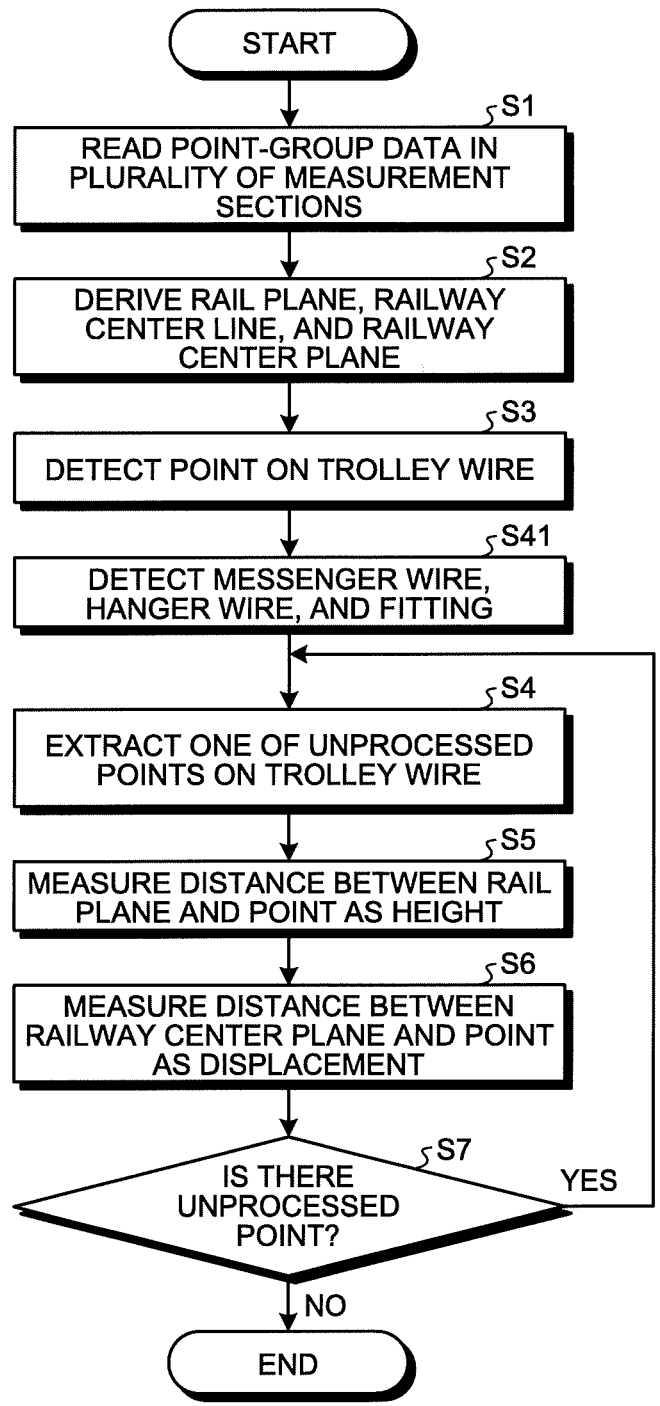
FIG. 27 is a flowchart illustrating a trolley-wire measuring process in the trolley-wire measurement device according to the fourth embodiment.

FIG. 27 is a flowchart illustrating a trolley-wire measuring process in the trolley-wire measurement device 1b according to the fourth embodiment. As compared to the flowchart according to the first embodiment illustrated in FIG. 13, a process of detecting the messenger wire 103, the hanger wire, and the fitting in the support-point detection unit 70 is added as Step S41 between Step S3 and Step S4, Step S41 coming before Step S4 to which the process returns when the determination at Step S7 is YES. Other processes are identical to those in the first embodiment.

Although the present embodiment has been described with reference to the first embodiment, the present embodiment can be also applied to the second and third embodiments.

In a hardware configuration of the trolley-wire measurement device 1b, the support-point detection unit 70 is implemented by a processing circuit similar to the processing circuit of the trolley-wire detection unit 30 and the like, that is, implemented by dedicated hardware, software, firmware, or a combination thereof.

As described above, according to the present embodiment, the trolley-wire measurement device 1b further detects the messenger wire 103, a hanger wire, a fitting, and the like that support the trolley wire 102, in addition to performing the processes in the first embodiment. Accordingly, information on the messenger wire 103, the hanger wire, and the fitting can be added to the measurement result of the height 115 and the displacement 117 of the point 113 on the trolley wire 102, thereby providing the information useful for the personnel in charge of maintenance.

The configurations described in the above embodiments are only examples of the content of the present invention. The configurations can be combined with other well-known techniques, and a part of each configuration can be omitted or modified without departing from the scope of the present invention.

REFERENCE SIGNS LIST 1, 1a, 1b trolley-wire measurement device, 2 measuring device, 3 trolley-wire measurement system, 10 storage unit, 11 point-group data, 20 railway measurement unit, 21 rail detection unit, 22 reference setting unit, 30 trolley-wire detection unit, 40 height and displacement measurement unit, 50 data input unit, 60 measurement-result output unit, 70 support-point detection unit, 81 three-dimensional measurement unit, 82 data output unit.

The invention claimed is:

1. A trolley-wire measurement device comprising:
rail detection circuitry to detect rails from point-group data that is an aggregate of points obtained by measuring a target object three-dimensionally, the rails defining a railway on which a train runs;
reference setting circuitry to set a reference for measuring a height and a displacement of a point on a trolley wire on a basis of the rails detected from the point-group data in the rail detection circuitry;
trolley-wire detection circuitry to detect the point on the trolley wire from the point-group data;
height and displacement measurement circuitry to measure the height and the displacement of the point on the trolley wire by using the reference; and
a data input receiver to obtain latest point-group data from a measuring device to measure the target object three-dimensionally, wherein
the rail detection circuitry detects the rails by using the latest point-group data obtained, and updates a rail position,
the reference setting circuitry sets the reference for measuring the height and the displacement of the point on the trolley wire on a basis of rails detected from the latest point-group data and previous point-group data,
the trolley-wire detection circuitry detects the point on the trolley wire from the latest point-group data obtained, and
the height and displacement measurement circuitry measures the height and the displacement of the point on the trolley wire detected from the latest point-group data, by using the reference set on the basis of the rails detected from the latest point-group data and the previous point-group data.

2. The trolley-wire measurement device according to claim 1, wherein the rails are two in number, and
the reference setting circuitry derives a rail plane including surfaces through which the two rails contact the train, a railway center line positioned at a center between the two rails on the rail plane, and a railway center plane orthogonal to the rail plane on the railway center line, and outputs the rail plane as a first reference and the railway center plane as a second reference, to the height and displacement measurement circuitry, and
the height and displacement measurement circuitry measures a distance between the first reference and the point on the trolley wire, as the height of the point on the trolley wire, and measures a distance between the second reference and the point on the trolley wire, as the displacement of the point on the trolley wire.

3. The trolley-wire measurement device according to claim 2, wherein
when the point-group data includes points regarding a plurality of railways,
the rail detection circuitry detects the rails on a railway-by-railway basis,
the reference setting circuitry derives the rail plane, the railway center line, and the railway center plane on the railway-by-railway basis, and outputs the first reference and the second reference for each railway, to the height and displacement measurement circuitry,
the trolley-wire detection circuitry detects a point on the trolley wire on the railway-by-railway basis, and
the height and displacement measurement circuitry measures a height and a displacement of the point on the trolley wire on a railway-by-railway basis.

4. The trolley-wire measurement device according to claim 1, wherein the rails are two in number, and
the reference setting circuitry derives a rail plane including surfaces through which the two rails contact the train, and a railway center line positioned at a center between the two rails on the rail plane, and outputs the rail plane as a first reference and the railway center line as a second reference, to the height and displacement measurement circuitry, and
the height and displacement measurement circuitry measures a distance between the first reference and the point on the trolley wire, as the height of the point on the trolley wire, and measures a distance between the second reference and a foot of a perpendicular extending from the point on the trolley wire to the first reference, as the displacement of the point on the trolley wire.

5. The trolley-wire measurement device according to claim 4, wherein
when the point-group data includes points regarding a plurality of railways,
the rail detection circuitry detects the rails on a railway-by-railway basis,
the reference setting circuitry derives the rail plane and the railway center line on the railway-by-railway basis, and outputs the first reference and the second reference for each railway, to the height and displacement measurement circuitry,
the trolley-wire detection circuitry detects a point on the trolley wire on the railway-by-railway basis, and
the height and displacement measurement circuitry measures a height and a displacement of the point on the trolley wire on the railway-by-railway basis.

6. The trolley-wire measurement device according to claim 1, comprising a storage to store therein the point-group data.

7. The trolley-wire measurement device according to claim 1, comprising a measurement-result transmission circuitry to output a measurement result of the height and the displacement of the point on the trolley wire which have been measured by the height and displacement measurement circuitry.

8. The trolley-wire measurement device according to claim 1, comprising support-point detection circuitry to detect from the point-group data a point on a messenger wire, a point on a hanger wire, and a point on a fitting, the messenger wire, the hanger wire, and the fitting being arranged to support the trolley wire.

9. A trolley-wire measurement method comprising:
detecting rails from point-group data that is an aggregate of points obtained by measuring a target object three-dimensionally, the rails defining a railway on which a train runs;

setting a reference for measuring a height and a displacement of a point on a trolley wire on a basis of the rails detected from the point-group data;
detecting the point on the trolley wire from the point-group data;
measuring the height and the displacement of the point on the trolley wire by using the reference;
obtaining latest point-group data from a measuring device to measure the target object three-dimensionally, wherein
detecting the rails comprises detecting the rails by using the latest point-group data obtained, and updating a rail position,
setting the reference comprises setting the reference for measuring the height and the displacement of the point on the trolley wire on a basis of rails detected from the latest point-group data and previous point-group data,
detecting the point on the trolley wire comprises detecting the point on the trolley wire from the latest point-group data obtained, and
measuring the height and the displacement of the point on the trolley wire comprises measuring the height and the displacement of the point on the trolley wire detected from the latest point-group data, by using the reference set on the basis of the rails detected from the latest point-group data and the previous point-group data.

10. The trolley-wire measurement method according to claim 9, wherein the rails are two in number, and
setting the reference comprises deriving a rail plane including surfaces through which the two rails contact the train, a railway center line positioned at a center between the two rails on the rail plane, and a railway center plane orthogonal to the rail plane on the railway center line, and outputting the rail plane as a first reference and the railway center plane as a second reference, and
measuring the height and the displacement of the point on the trolley wire comprises measuring a distance between the first reference and the point on the trolley wire, as the height of the point on the trolley wire, and measuring a distance between the second reference and the point on the trolley wire, as the displacement of the point on the trolley wire.

11. The trolley-wire measurement method according to claim 10, wherein
when the point-group data includes points regarding a plurality of railways,
detecting the rails comprises detecting the rails on a railway-by-railway basis,
setting the reference comprises deriving the rail plane, the railway center line, and the railway center plane on the railway-by-railway basis, and outputting the first reference and the second reference for each railway,
detecting the point on the trolley wire comprises detecting a point on the trolley wire on the railway-by-railway basis, and
measuring the height and the displacement of the point on the trolley wire comprises measuring a height and a displacement of the point on the trolley wire on the railway-by-railway basis.

12. The trolley-wire measurement method according to claim 9, wherein the rails are two in number, and
setting the reference comprises deriving a rail plane including surfaces through which the two rails contact the train, and a railway center line positioned at a center between the two rails on the rail plane, and outputting the rail plane as a first reference and the railway center line as a second reference, and
measuring the height and the displacement of the point on the trolley wire comprises measuring a distance between the first reference and the point on the trolley wire, as the height of the point on the trolley wire, and measuring a distance between the second reference and a foot of a perpendicular extending from the point on the trolley wire to the first reference, as the displacement of the point on the trolley wire.

13. The trolley-wire measurement method according to claim 12, wherein
when the point-group data includes points regarding a plurality of railways,
detecting the rails comprises detecting the rails on a railway-by-railway basis,
setting the reference comprises deriving the rail plane and the railway center line on the railway-by-railway basis, and outputting the first reference and the second reference for each railway,
detecting the point on the trolley wire comprises detecting a point on the trolley wire on the railway-by-railway basis, and
measuring the height and the displacement of the point on the trolley wire comprises measuring a height and a displacement of the point on the trolley wire on the railway-by-railway basis.

14. The trolley-wire measurement method according to claim 9, comprising outputting a measurement result of the height and the displacement of the point on the trolley wire which have been measured.

15. The trolley-wire measurement method according to claim 9, comprising detecting a point on a messenger wire, a point on a hanger wire, and a point on a fitting, the messenger wire, the hanger wire, and the fitting being arranged to support the trolley wire.

16. The trolley-wire measurement device according to claim 1, wherein the trolley-wire detection circuitry detects the point on the trolley wire from the point-group data within an area set on the basis of the reference set by the reference setting circuitry.

17. The trolley-wire measurement device according to claim 1, wherein the reference setting circuitry sets the reference on a basis of positions on inner sides of top portions of two, left and right ones of the rails detected in the rail detection circuitry.

18. The trolley-wire measurement device according to claim 1, wherein when a plurality of target objects are detected in an area of an extracted point group, the trolley-wire detection circuitry detects a target object positioned on a lower side of the detected target objects, as a trolley wire.

19. The trolley-wire measurement method according to claim 9, wherein detecting the point on the trolley wire comprises detecting the point on the trolley wire from the point-group data within an area set on a basis of the reference set.

20. The trolley-wire measurement method according to claim 9, wherein setting the reference comprises setting the reference on a basis of positions on inner sides of top portions of two, left and right ones of the rails detected.

21. The trolley-wire measurement method according to claim 9, wherein when a plurality of target objects are detected in an area of an extracted point group, detecting the point on the trolley wire comprises detecting a target object positioned on a lower side of the detected target objects, as a trolley wire.

* * * * *